(12) United States Patent
Abe et al.

(10) Patent No.: US 7,715,055 B2
(45) Date of Patent: May 11, 2010

(54) DETECTION OF UNDESIRED DOCUMENT ALTERATION AND DUPLICATION, AND GENERATING VERIFICATION DATA FOR SUCH DETECTION

(75) Inventors: Yasushi Abe, Yokohama (JP); Masaki Ishii, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1218 days.

(21) Appl. No.: 11/020,665

(22) Filed: Dec. 27, 2004

(65) Prior Publication Data
US 2005/0152006 A1  Jul. 14, 2005

(30) Foreign Application Priority Data
Jan. 8, 2004 (JP) .............................. 2004-003438
Mar. 8, 2004 (JP) .............................. 2004-063405

(51) Int. Cl.
G06K 15/00 (2006.01)
H04N 1/40 (2006.01)
G06K 1/00 (2006.01)
G06F 15/00 (2006.01)

(52) U.S. Cl. ..................................... 358/3.28; 358/1.14
(58) Field of Classification Search ................ 382/100; 358/3.28, 1.13, 1.14, 1.15, 1.18; 713/176
See application file for complete search history.

(56) References Cited

U.S. PATENT DOCUMENTS 5,555,099 A * 9/1996 Telle .......................... 358/401
6,580,804 B1    6/2003 Abe
6,741,722 B2    5/2004 Abe
2001/0031132 A1* 10/2001 Shirakawa et al. ............ 386/52
2003/0223614 A1* 12/2003 Robins et al. ................ 382/100
2004/0022444 A1*  2/2004 Rhoads ........................ 382/232
2004/0037449 A1*  2/2004 Davis et al. .................. 382/100

FOREIGN PATENT DOCUMENTS

| JP | 8-297743    | 11/1996 |
| JP | 2695523     | 9/1997  |
| JP | 11-98344    | 4/1999  |
| JP | 2002-298120 | 10/2002 |

\* cited by examiner

*Primary Examiner*—Douglas Q Tran
(74) *Attorney, Agent, or Firm*—Dickstein Shapiro LLP

(57) ABSTRACT

Exemplary embodiments of the present invention provide an image processing apparatus, system, method, computer program and product, capable of generating verification data for detecting document alteration, generating a protected document embedded with the verification data, and detecting document alteration using the verification data. Other exemplary embodiments of the present invention provide an image processing apparatus, system, method, computer program and product, capable of generating verification data for detecting image alteration or document duplication, generating a protected document embedded with the verification data, and detecting image alteration or document duplication using the verification data.

12 Claims, 40 Drawing Sheets

FIG. 33
Receipt
Payee Name : XXX          Payer Name : Ricoh Co., Ltd
Date : January 30, 2004
Description
Total                                $1,000–
FIG. 34
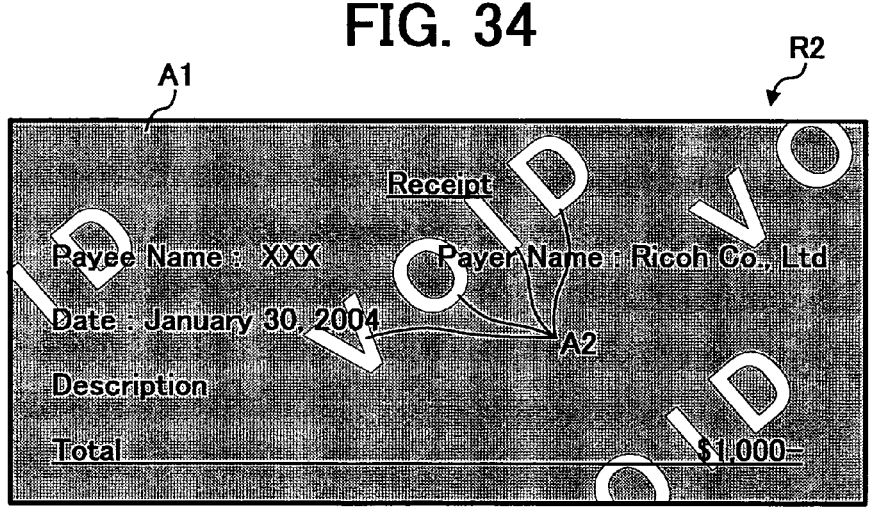
FIG. 35
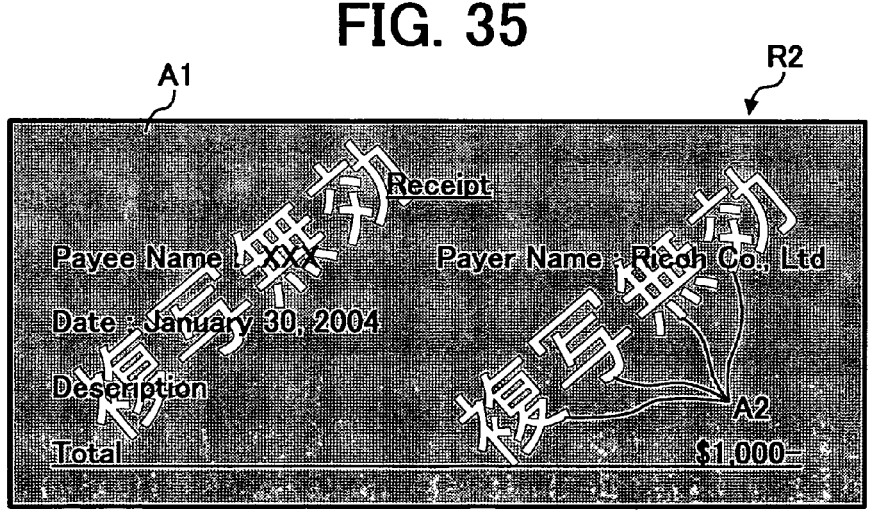

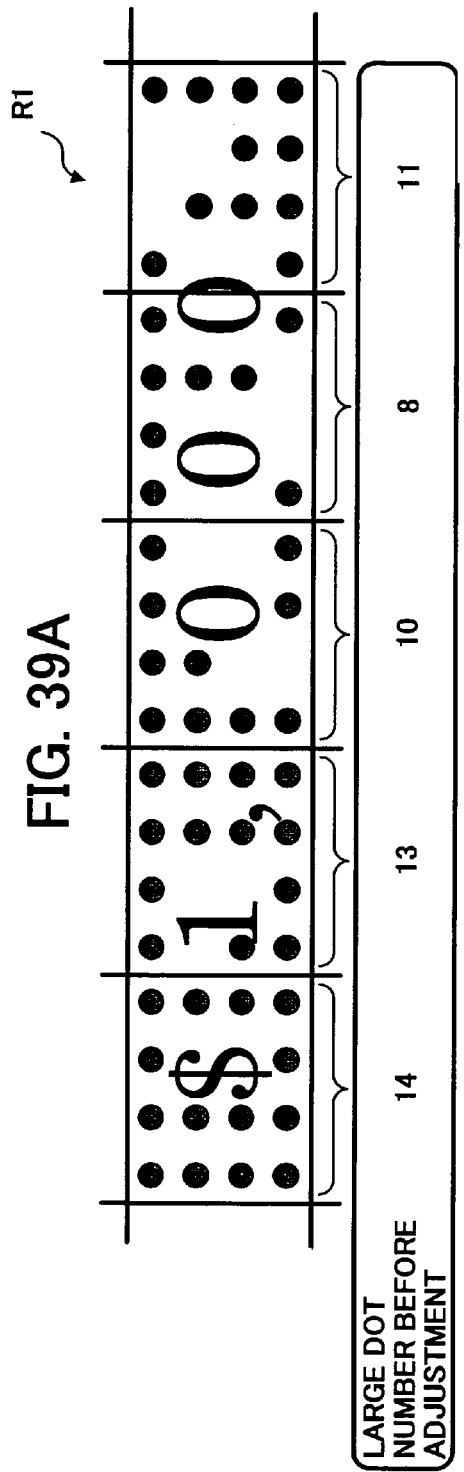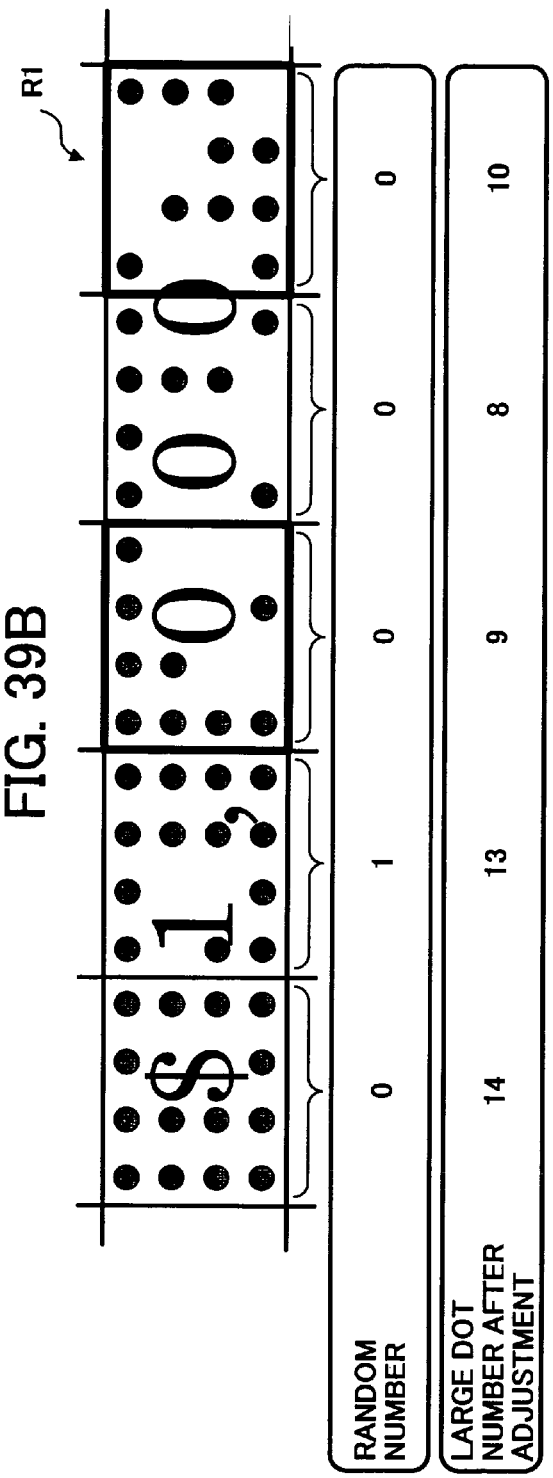

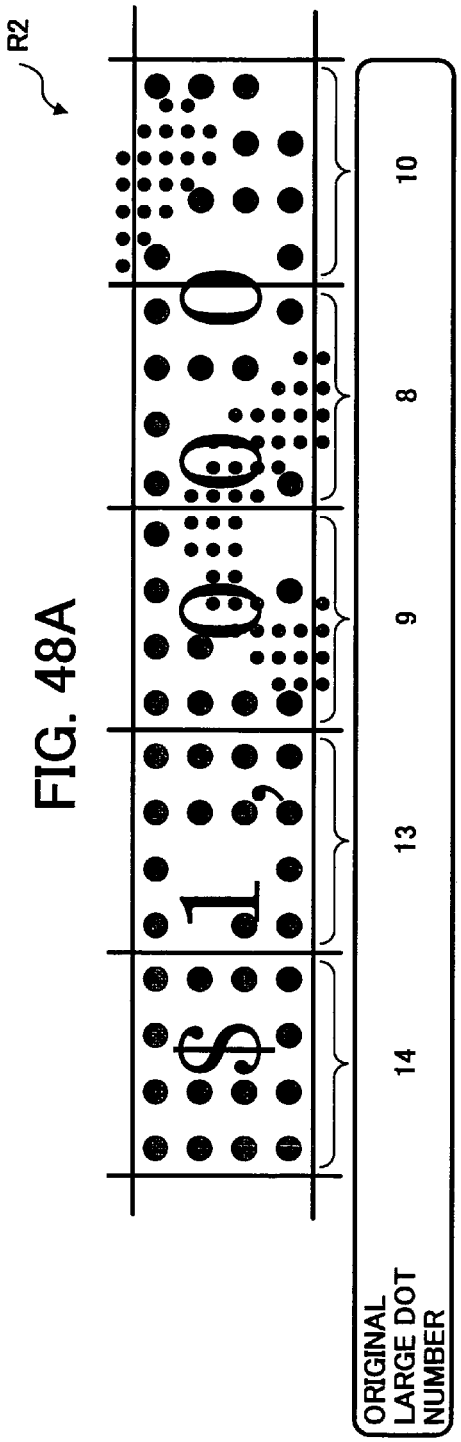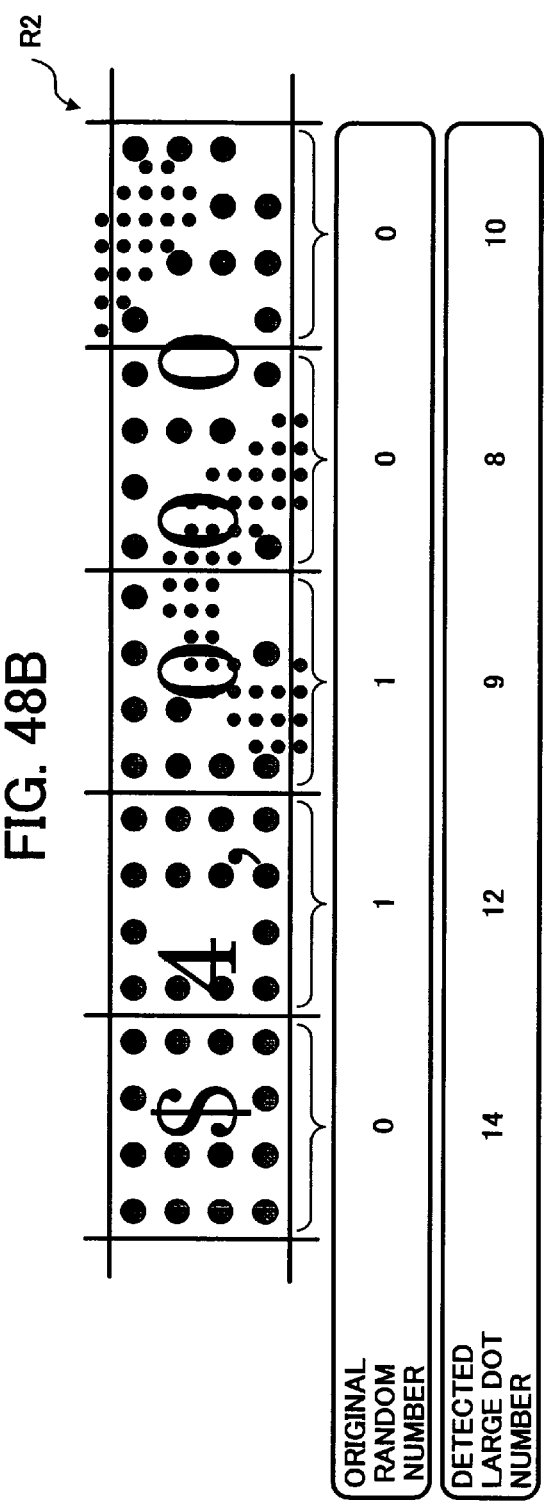

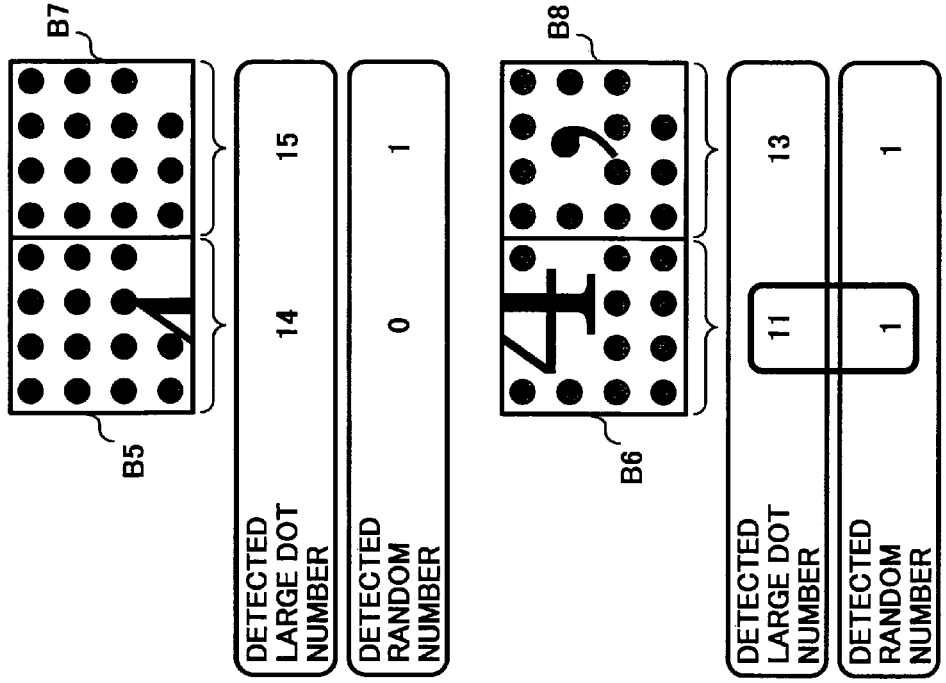
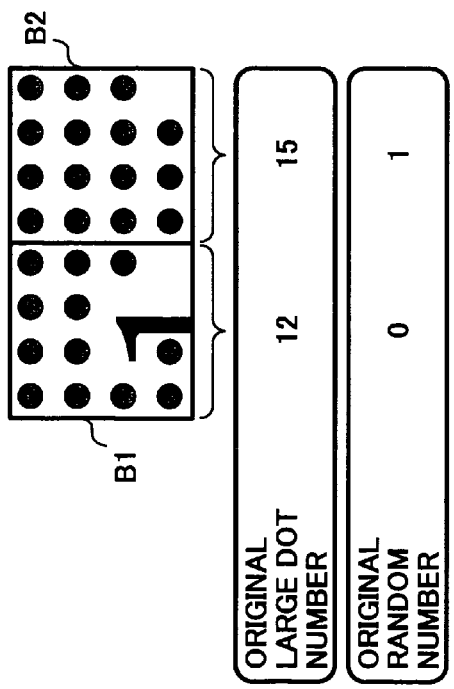
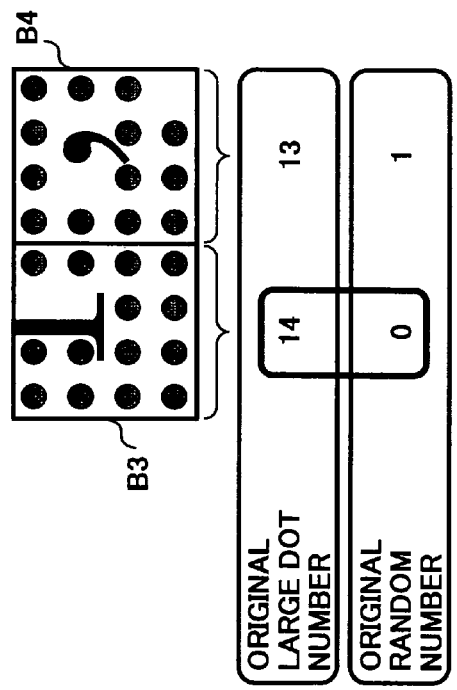

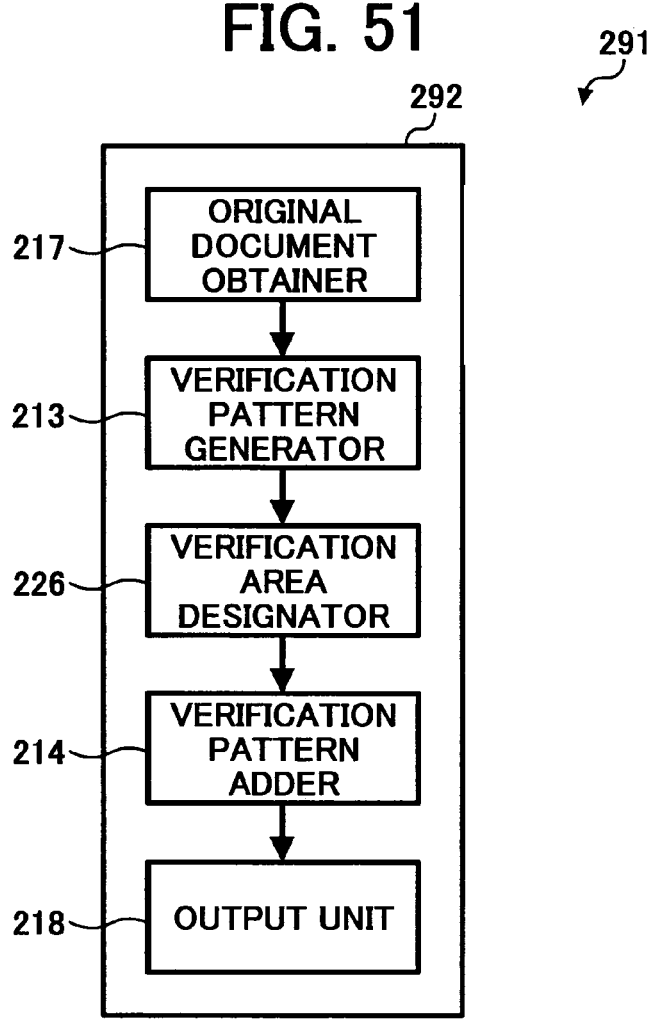

DETECTION OF UNDESIRED DOCUMENT ALTERATION AND DUPLICATION, AND GENERATING VERIFICATION DATA FOR SUCH DETECTION

CROSS-REFERENCE TO RELATED APPLICATIONS

The present invention claims priority to Japanese patent application Nos. JPAP 2004-003438 filed on Jan. 8, 2004, and JPAP 2004-063405 filed on Mar. 8, 2004, in the Japanese Patent Office, the entire contents of which are hereby incorporated by reference.

FIELD OF THE INVENTION

The present invention relates to generating verification data for detecting undesired document alteration or duplication, and to detecting undesired document alteration or duplication using the verification data.

DESCRIPTION OF THE RELATED ART

As protection of authenticity, integrity, or confidentiality of a document becomes an important issue, various techniques for increasing the level of document protection are introduced.

For example, U.S. Patent Application Publication No. 2004-0148261, filed by the applicant of the present invention, discloses a technique of detecting alteration of a printed material. However, the disclosed technique is not effective in detecting page addition, deletion, or replacement of the printer material. Further, it fails to provide a copyguard function, which discourages or detects unauthorized duplication of the printed material.

This specification refers the term "document alteration" as making an original document false by page addition, deletion, or replacement. Further, it refers the term "image alteration" as making an original document false by changing information or data contained in the document.

BRIEF SUMMARY OF THE INVENTION

Exemplary embodiments of the present invention provide an image processing apparatus, system, method, computer program and product, capable of generating verification data for detecting document alteration, generating a protected document embedded with the verification data, and detecting document alteration using the verification data.

Other exemplary embodiments of the present invention provide an image processing apparatus, system, method, computer program and product, capable of generating verification data for detecting image alteration or document duplication, generating a protected document embedded with the verification data, and detecting image alteration or document duplication using the verification data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 33 is an exemplary original document to be processed by an image processing apparatus of the present invention;

FIG. 34 is an exemplary protected document generated based on the exemplary original document of FIG. 33;

FIG. 35 is another exemplary protected document generated based on the exemplary original document of FIG. 33;

FIGS. 39A and 39B are illustrations explaining an exemplary operation of adjusting a large dot number according to a preferred embodiment of the present invention;

FIGS. 48A and 48B are illustrations explaining an exemplary operation of detecting image alteration according to a preferred embodiment of the present invention;

FIGS. 50A and 50B are illustrations showing an exemplary operation of detecting image alteration according to another preferred embodiment of the present invention;

FIG. 51 is a block diagram illustrating a functional structure of an image processing system according to a preferred embodiment of the present invention;

FIG. 52 is an exemplary protected document generated based on the exemplary original document of FIG. 33;

DETAILED DESCRIPTION OF THE INVENTION

Figure 1:
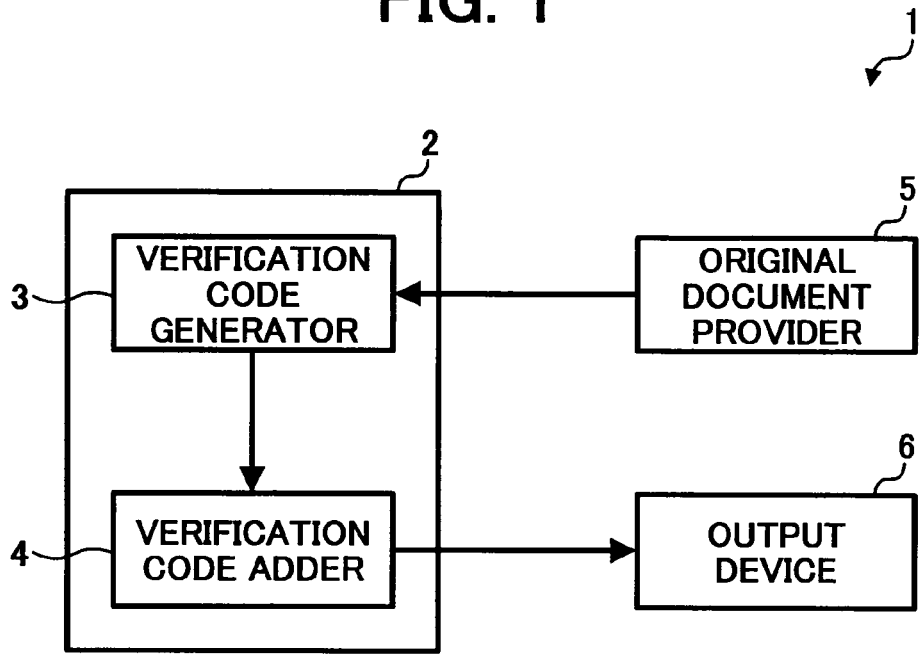
FIG. 1 is a block diagram illustrating a functional structure of an image processing system according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1 to 28, a description is made of image processing apparatus or systems, capable of generating verification data for detecting document alteration, and/or capable of detecting document alteration using the verification data.

First, image processing apparatus 2, 12, 22, and 32, capable of generating a set of verification codes for detecting document alteration, are explained according to preferred embodiments of the present invention.

Referring to FIG. 1, the image processing apparatus 2 includes a verification code generator 3, and a verification code adder 4. The verification code generator 3 is coupled to an original document provider 5. The verification code adder 4 is coupled to an output device 6.

The original document provider 5 provides an original document to the image processing apparatus 2. The verification code generator 3 generates a set of verification codes from the original document, and sends it to the verification code adder 4. The verification code adder 4 adds the set of verification codes to the original document, and provides it to the output device 6 as a protected document. The output device 6 outputs the protected document.

The original document provider 5 includes any kind of reading device capable of reading an original document, such as a scanner. Alternatively, the original document provider 5 may include any kind of storage device capable of previously storing an original document.

The output device 6 includes any kind of image forming device capable of visualizing the protected document, such as a printer or copier.

With the original document provider 5 and the output device 6, the image processing apparatus 2 may form an image processing system 1, capable of generating a protected document having a set of verification codes.

Figure 2:
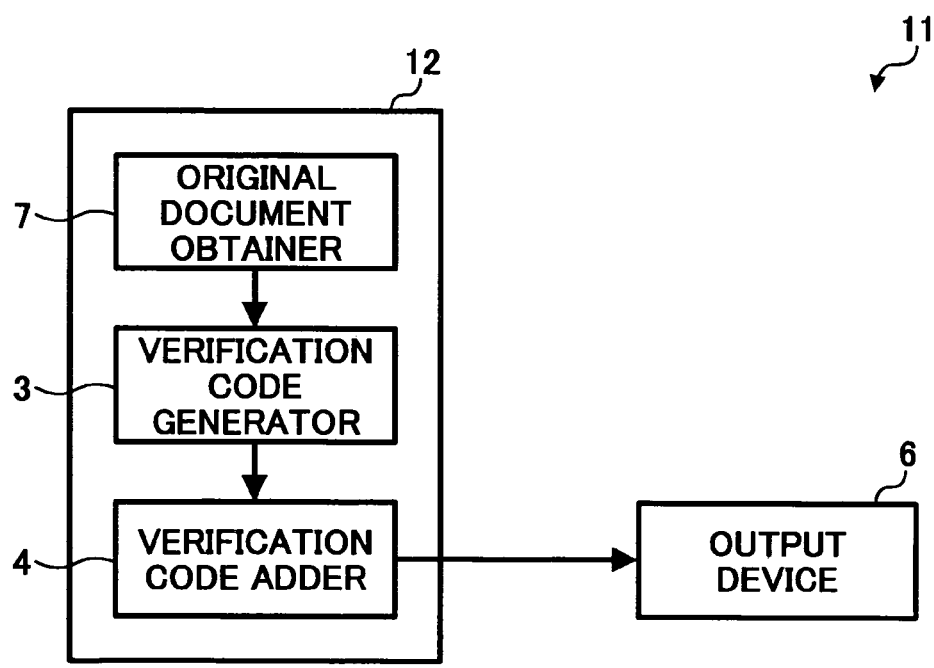
FIG. 2 is a block diagram illustrating a functional structure of an image processing system according to another preferred embodiment of the present invention.

The image processing apparatus 12 shown in FIG. 2 is substantially similar to the image processing apparatus 2 of FIG. 1, except for the addition of an original document obtainer 7. The original document obtainer 7 obtains an original document from the outside. In other words, the image processing apparatus 12 and the output device 6 may form an image processing system 11, which functions similarly to the image processing system 1.

Figure 3:
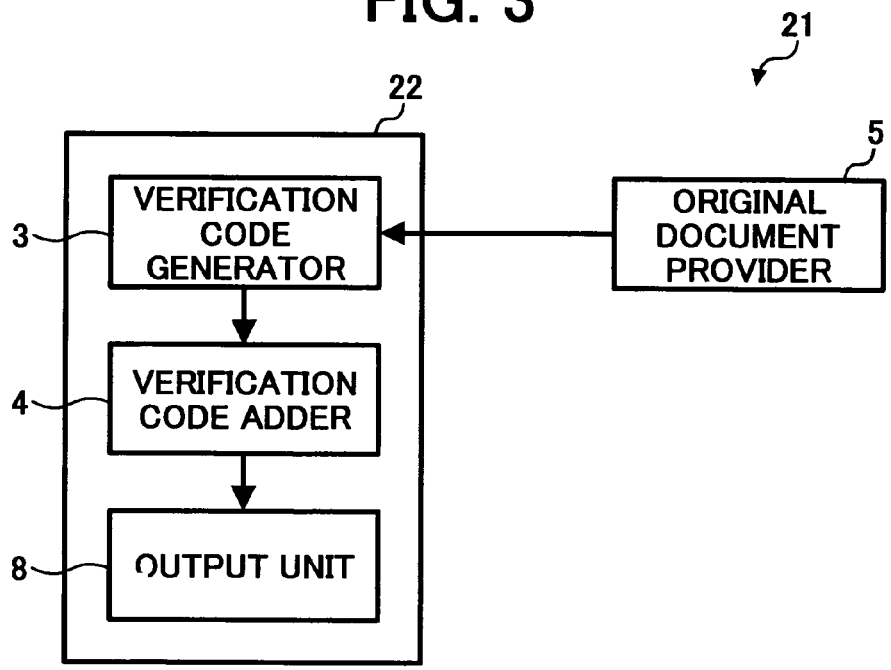
FIG. 3 is a block diagram illustrating a functional structure of an image processing system according to another preferred embodiment of the present invention.

The image processing apparatus 22 shown in FIG. 3 is substantially similar to the image processing apparatus 2 of FIG. 1, except for the addition of an output unit 8. The output unit 8 outputs a protected document. In other words, the image processing apparatus 22 and the original document provider 5 may form an image processing system 21, which functions similarly to the image processing system 1.

Figure 4:
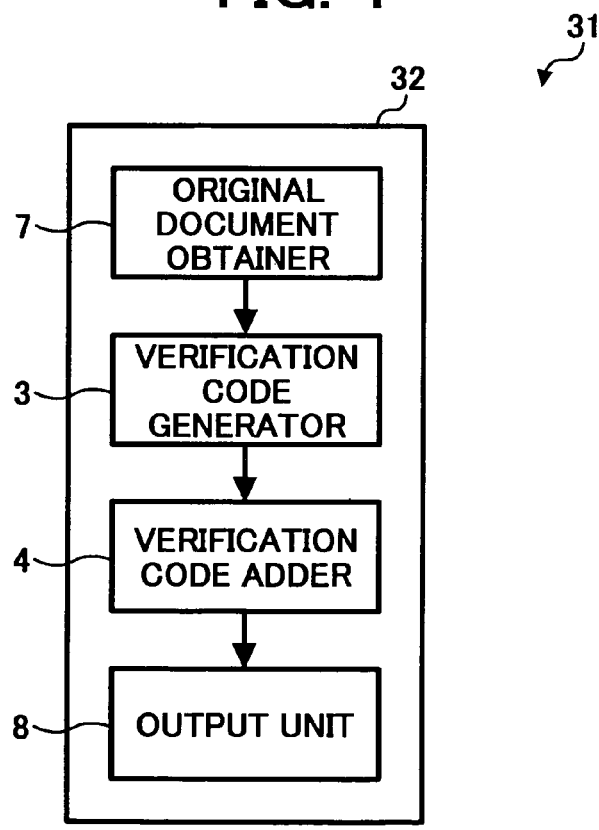
FIG. 4 is a block diagram illustrating a functional structure of an image processing system according to another preferred embodiment of the present invention.

Referring to FIG. 4, the image processing apparatus 32 includes the original document obtainer 7, the verification code generator 3, the verification code adder 4, and the output unit 8. The image processing apparatus 32 may form an image processing system 31, which functions similarly to any one of the image processing systems 1, 11, and 21.

Figure 5:
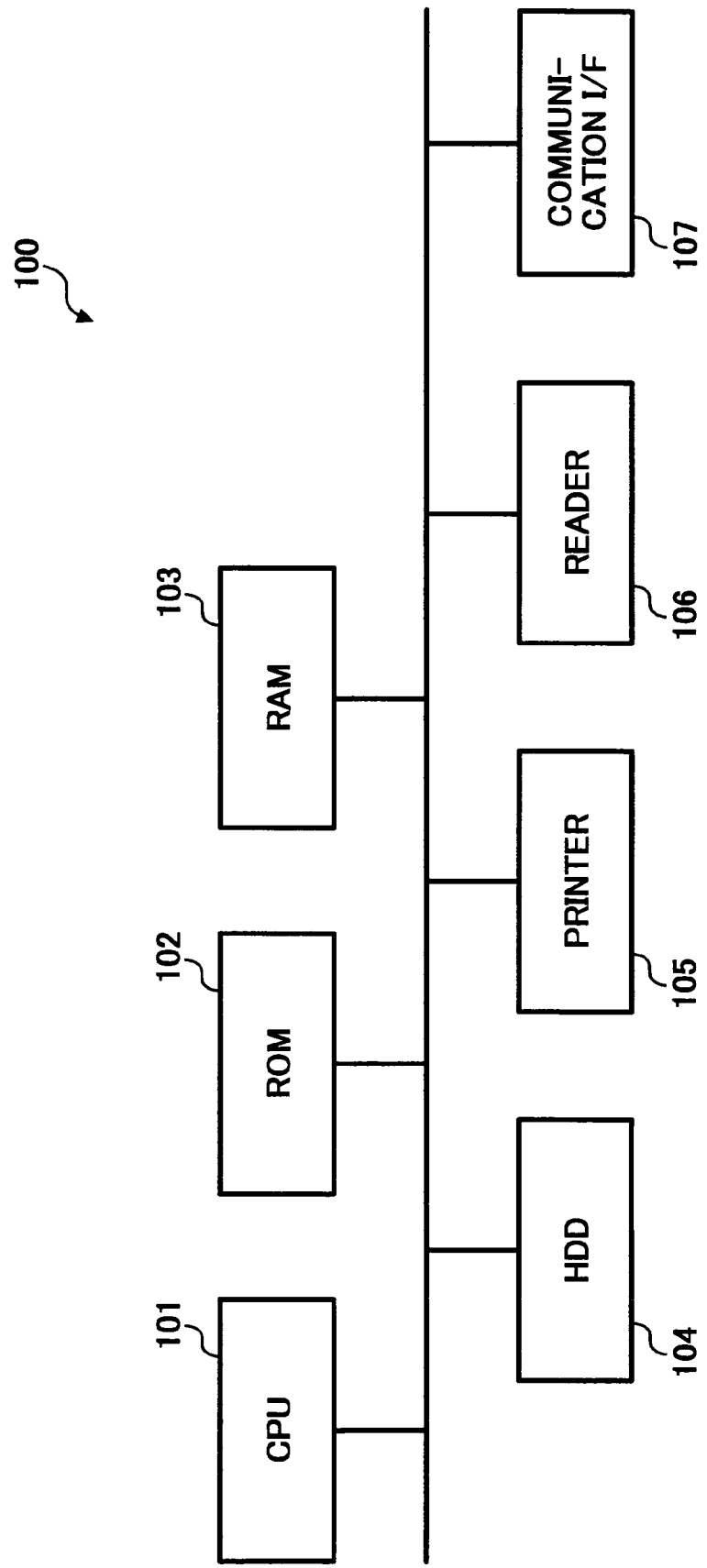
FIG. 5 is a block diagram illustrating a hardware structure of an image processing system according to another preferred embodiment of the present invention.

The above-described and other image processing systems, capable of generating a protected document having a set of verification codes, may be implemented in various ways. FIG. 5 illustrates one preferred implementation. An image processing system 100 of FIG. 5 includes a CPU (central processing unit) 101, a ROM (read only memory) 102, a RAM (random access memory) 103, a HDD (hard disk drive) 104, a printer 105, a reader 106, and a communication I/F (interface) 107.

The CPU 101 includes any kind of processor, controlling an entire operation of the image processing system 100. The ROM 102 includes any kind of involatile memory. The RAM 103 includes any kind of volatile memory, functioning as a work memory for the CPU 101.

The printer 105 includes any kind of image forming apparatus capable of printing a protected document, including a printer, plotter, facsimile, and multifunctional printer, for example.

The reader 106 includes any kind of reading apparatus capable of reading an original document and preferably having an analog/digital conversion function, such as a scanner, facsimile, computer, multifunctional printer, etc., or a recording medium apparatus, for example.

The communication I/F 107 may be optionally provided to allow the image processing system 100 to communicate with other apparatus or system via a communication line or a network. In one example, the communication I/F 107 may allow the CPU 101 to obtain an original document from the outside system. In another example, the communication I/F 107 may allow the CPU 101 to output a protected document to the outside system.

The HDD 104 includes any kind of storage device. The HDD 104 preferably stores a verification code generating program and a verification code adding program of the present invention. It may additionally store other computer programs to be used by the CPU 101. Such programs include, for example, an original document obtainer program such as a reader program to be used for controlling the reader 106 and a communication program to be used for controlling the communication I/F 107, and an outputting program such as a printer program to be used for controlling the printer 105.

In operation, the image processing system 100 may load at least the verification code generating program and the verification code adding program from the HDD 104 onto the RAM 103, and instruct the CPU 101 or any one of the other devices in the system 100 to operate according to the loaded programs. In this way, the image processing system 100 may operate as any one of the above-described and other image processing systems of the present invention, capable of generating a protected document having a set of verification codes.

Alternatively, any one of the above-described programs may be previously stored in any kind of computer-readable medium, such as CDs (compact discs), DVDs (digital video discs), a floppy disk, a magneto-optical disk, etc. Further, any one of the above-described programs may be previously stored in the outside of the image processing system 100, and may be downloaded through a network or a communication line using the communication I/F 107.

Further, the image processing system 100 may additionally include a display, capable of displaying instructions given by the CPU 101 or the protected document to be printed by the printer 105, for example. Examples of the display include a CRT (cathode ray tube) and an LCD (liquid crystal display).

Furthermore, the image processing system 100 may additionally include any kind of peripheral devices, including an input device such as a keyboard and a mouse, a speaker, etc.

Figure 6:
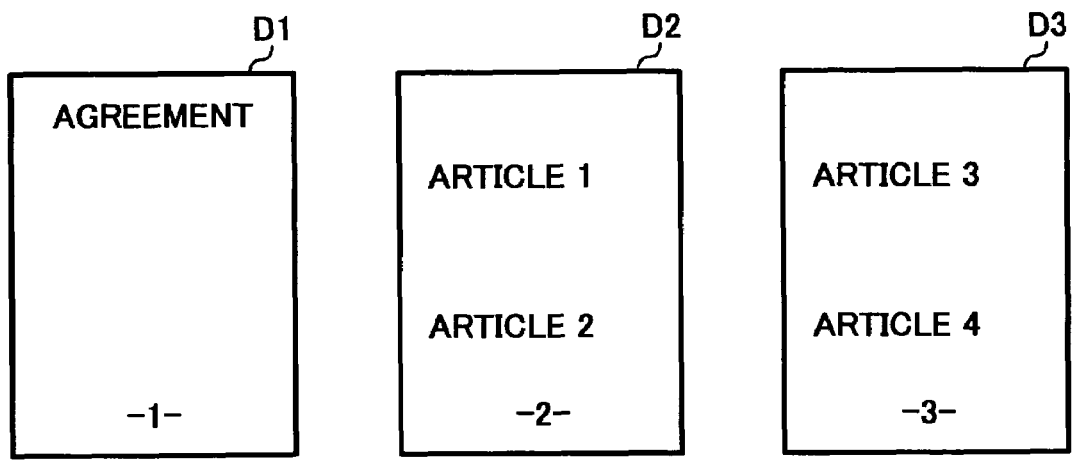
FIG. 6 is an exemplary original document to be processed by an image processing system of the present invention.
Figure 7:
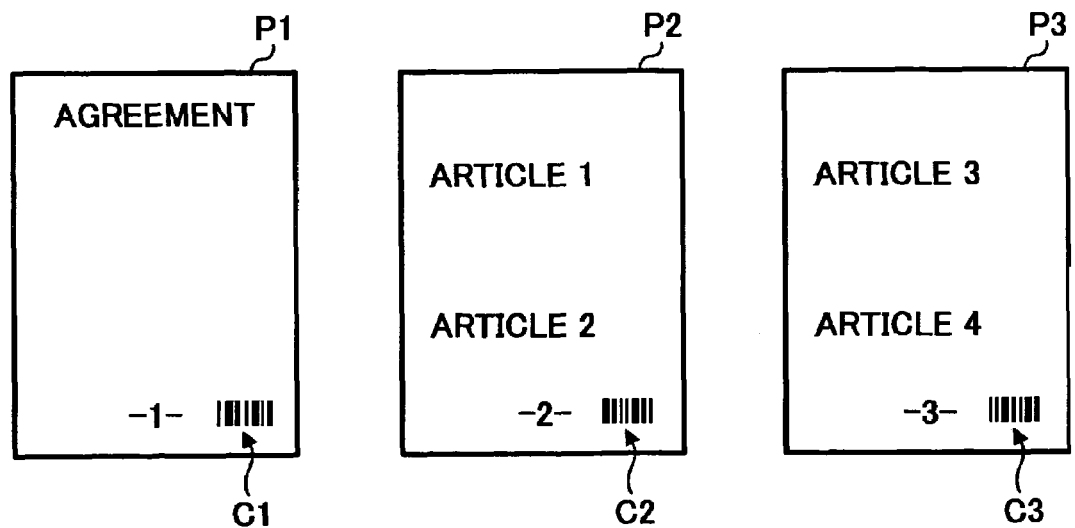
FIG. 7 is an exemplary protected document generated based on the exemplary original document of FIG. 6.

Referring now to FIGS. 6 and 7, generating a protected document having a set of verification codes is explained.

The image processing system 100 obtains an original document to be processed. The original document is preferably a confidential document, including a plurality of original images arranged in a sequential order. This exemplary case uses a confidential document of FIG. 6, including first, second and third original images D1, D2 and D3. The first original image D1 is previously assigned with a page number 1. The second original image D2 is previously assigned with a page number 2. The third original image D3 is previously assigned with a page number 3. The first to third original images D1 to D3 are previously arranged in an order corresponding to the page numbers being assigned, and are read by the image processing system 100 in such order.

The image processing system 100 generates first to third verification codes for the first to third original images D1 to D3, respectively. The verification code may be in the form of barcode as shown in FIG. 7, or it may be in the form of any other labels or tags, including integrated circuit chips, for example.

The image processing system 100 adds the verification codes, respectively, to the first to third original images D1 to D3, thus generating first to third protected images P1 to P3. In this case, each of the verification codes is preferably embedded in a border portion of the corresponding original image, which has no image data, as shown in FIG. 7.

The image processing system 100 outputs the protected document having the first, second, and third protected images P1, P2, and P3, preferably in this order.

Figures 8A, 8B, 8C:
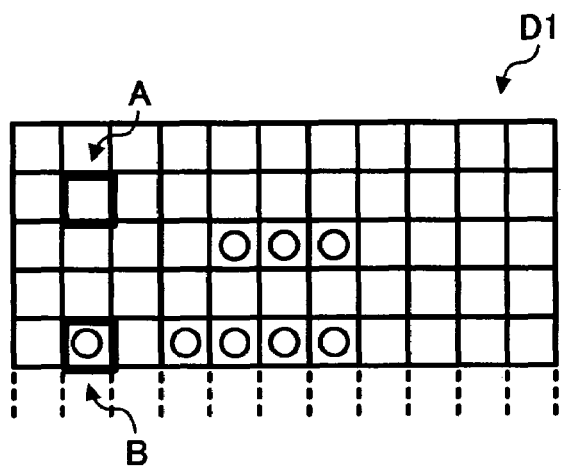
FIGS. 8A to 8C are illustrations explaining an exemplary operation of generating a bit sequence, according to a preferred embodiment of the present invention.
Figure 9:
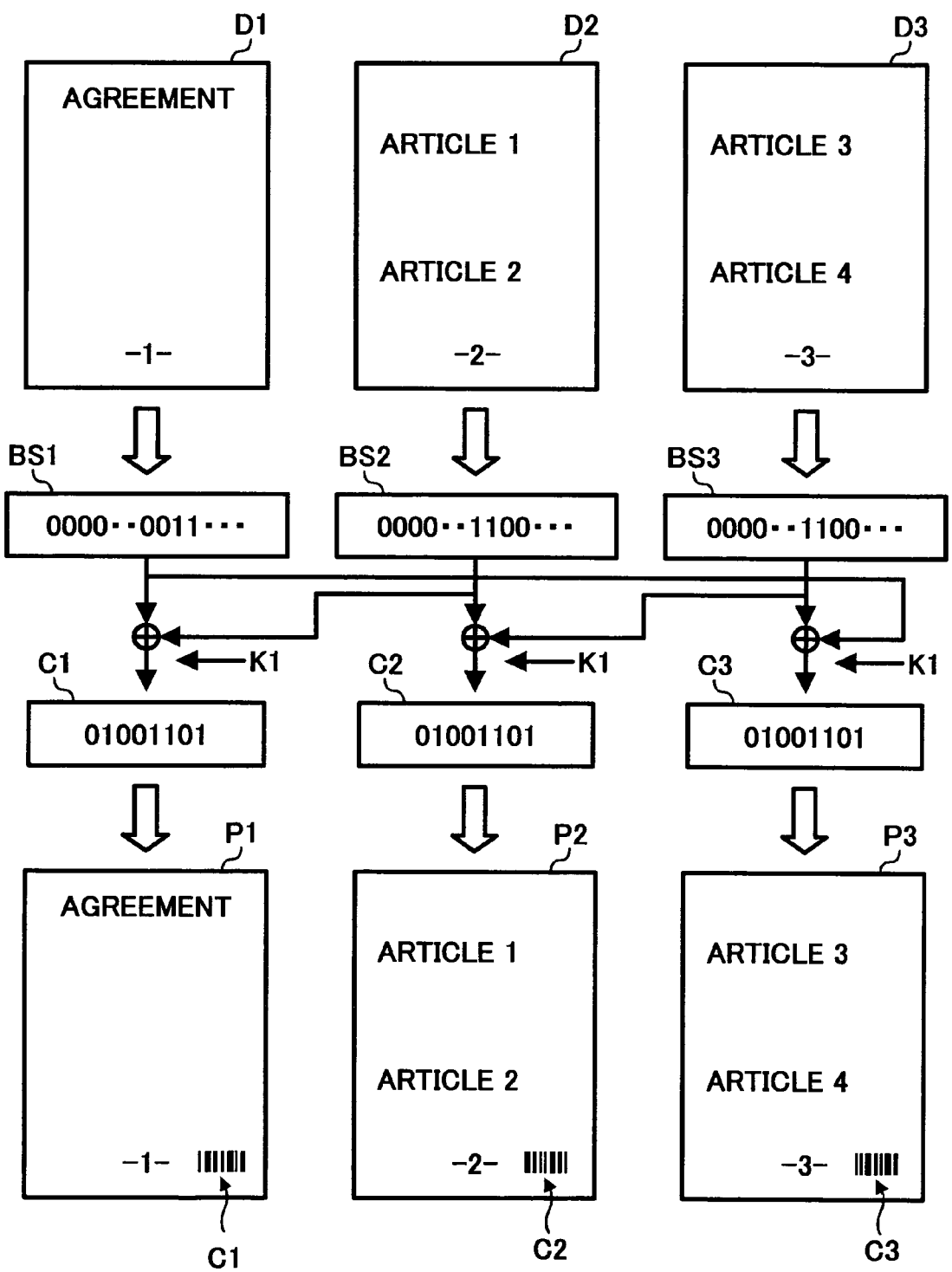
FIG. 9 is an illustration explaining an exemplary operation of generating a verification code according to a preferred embodiment of the present invention.
Figure 10:
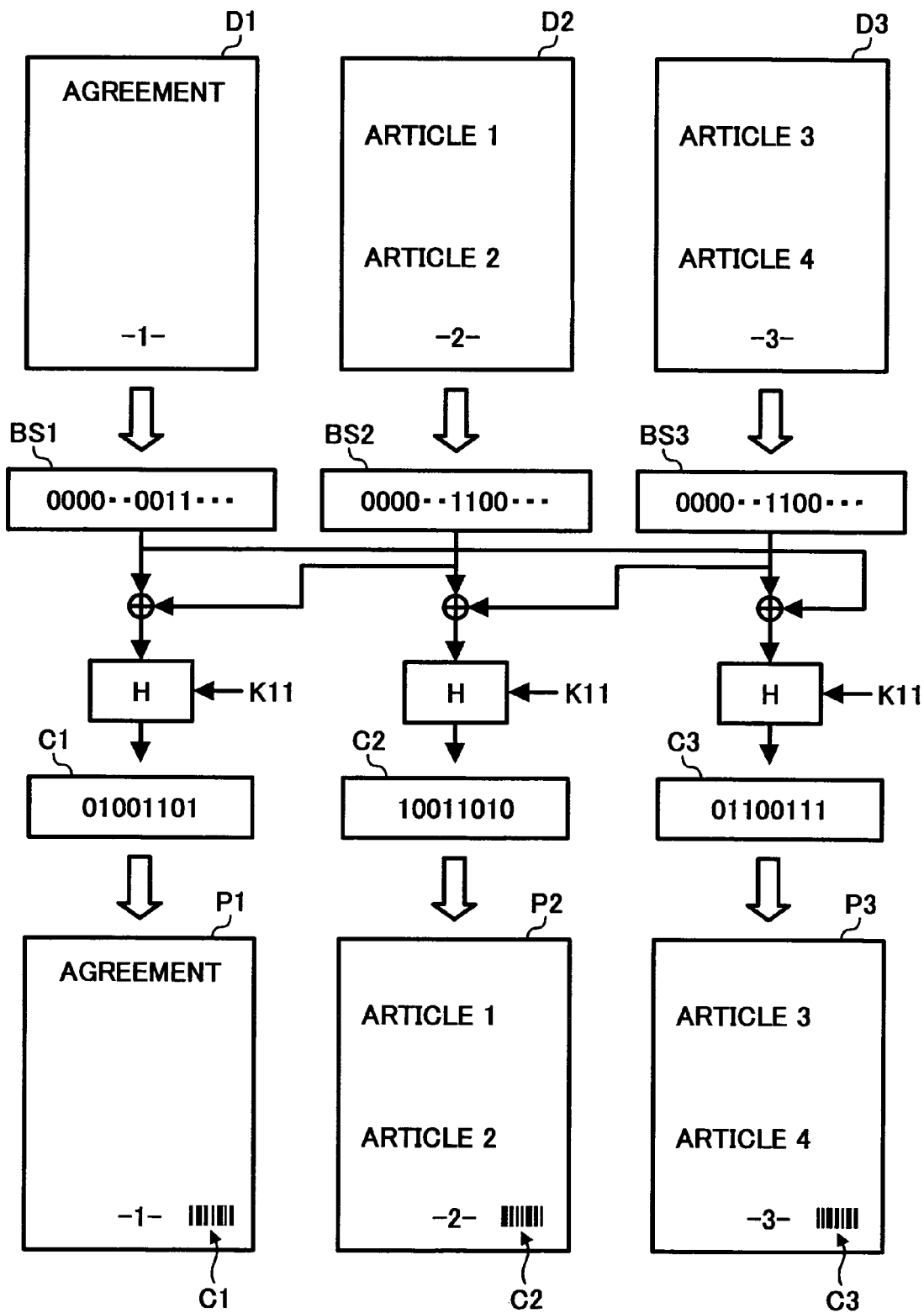
FIG. 10 is an illustration explaining an exemplary operation of generating a verification code according to another preferred embodiment of the present invention.

Now, referring to FIGS. 8 to 10, generating a verification code is explained.

First, upon receiving the first original image D1, the image processing system 100 divides the first original image D1 into a plurality of blocks, as illustrated in FIG. 8A.

Next, the image processing system 100 assigns the value "1" to the block having image data thereon, and assigns the value "0" to the block having no image data thereon. For example, the image processing system 100 assigns the value "0" to a block A of FIG. 8A, having no image data, while it assigns the value "1" to a block B of FIG. 8A, having image data. In this way, the first original document D1 may be converted to an original image of FIG. 8B, having a plurality of blocks, with each block being assigned with the value "0" or "1".

The image data includes any kind of data, which may be a portion of a character stroke or a line. For example, the image data may be a portion of a run of pixels having a predetermined length.

The original image of FIG. 8B is further converted to a first bit sequence BS1 of FIG. 8C, for example, by scanning the original image of FIG. 8B.

The image processing system 100 additionally generates a second bit sequence BS2 based on the second original image D2, and a third bit sequence BS3 based on the third original image D3, substantially similarly to the above-describe operation of generating the first bit sequence BS1.

Using the first to third bit sequences BS1 to BS3, the image processing system 100 generates the first to third verification codes C1 to C3 of FIG. 7, using cryptography illustrated in any one of FIGS. 9 and 10, for example. However, any other kind of cryptography in the art may be used.

In one example shown in FIG. 9, to generate the first verification code C1, the image processing system 100 combines the first bit sequence BS1 and the second bit sequence BS2, and encodes the combined bit sequence with a key K1.

Similarly, the image processing system 100 generates the second verification code C2, by combining the second bit sequence BS2 and the third bit sequence BS3 and by encoding the combined bit sequence with the key K1.

Further, the image processing system 100 generates the third verification code C3, by combining the first bit sequence BS1 and the third bit sequence BS3 and by encoding the combined bit sequence with the key K1.

In this exemplary case, the key K1 may be previously generated by the image processing system 100 or any other system.

In one example, the key K1 may serve as a common key.

In another example, the key K1, to be used as a secret key, may be previously generated together with a public key to be used for detecting document alteration.

In another example, the key K1, to be served as a common key, may be previously generated together with a secret key and a public key. The secret key is preferably used for detecting document alteration. The public key is preferably used to encode the key K1. In other words, the combined bit sequence may be encoded with the coded key K1.

Further, combining the bit sequences is not limited to the above exemplary case. For example, the first verification code C1 may be generated by combining the first bit sequence BS1 and the third bit sequence BS3. In such a case, the second verification code C2 is generated by combining the first bit sequence BS1 and the second bit sequence BS2. Similarly, the third verification code C3 is generated by combining the second bit sequence BS2 and the third bit sequence BS3. In other words, the verification code of a target original image is generated by combining a bit sequence generated from the target original image and a bit sequence generated from the original image succeeding or preceding the target original image.

In another example shown in FIG. 10, to generate the first verification code C1, the image processing system 100 combines the first bit sequence BS1 and the second bit sequence BS2, obtains a hash value of the combined bit sequence using a hash function H previously provided, and encodes the hash value with a key K11.

The image processing system 100 generates the second verification code C2 in a similar manner. Specifically, the image processing system 100 combines the second bit sequence BS2 and the third bit sequence BS3, obtains a hash value of the combined bit sequence using the hash function H, and encodes the hash value with the key K11.

The image processing system 100 generates the third verification code C3 in a similar manner. Specifically, the image processing system 100 combines the first bit sequence BS1 and the third bit sequence BS3, obtains a hash value of the combined sequence using the hash function H, and further encodes the hash value with the key K11.

The above exemplary case encodes each of the hash values with the key K11, however, such encoding is optional. Further, as illustrated above referring to FIG. 9, combining the bit sequences is not limited to the above exemplary case.

Referring now to FIGS. 11 to 14, a description is made of image processing apparatus 42, 52, 62, and 72, according to other preferred embodiments of the present invention.

The image processing apparatus 42, 52, 62, and 72 are all capable of detecting document alteration using a set of verification codes, extracted from a protected document. The following examples assume that the detected verification codes are basically the same as original verification codes, which are generated based on a set of original images.

Figure 11:
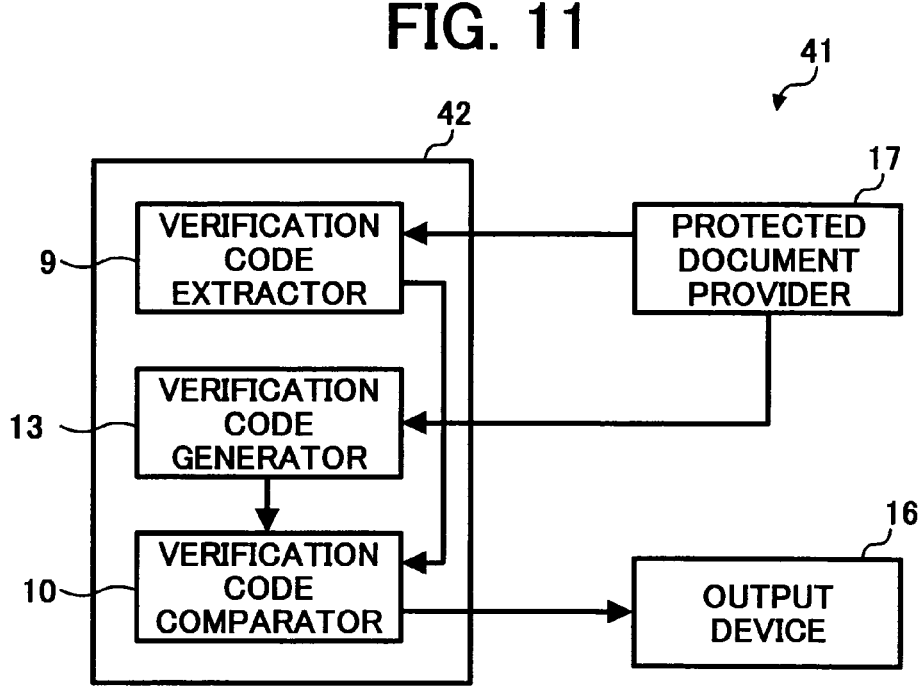
FIG. 11 is a block diagram illustrating a functional structure of an image processing system according to another preferred embodiment of the present invention.

Referring to FIG. 11, the image processing apparatus 42 includes a verification code extractor 9, a verification code generator 13, and a verification code comparator 10. The verification code extractor 9 is coupled to a protected document provider 17. The verification code comparator 10 is coupled to an output device 16.

The protected document provider 17 provides a protected document to the verification code extractor 9 and the verification code generator 13. The verification code extractor 9 extracts a set of detected verification codes from the protected document, and sends it to the verification code comparator 10. The verification code generator 13 generates a set of generated verification codes from the protected document, in a substantially similar manner performed by the verification code generator 3. The verification code comparator 10 compares the generated verification code with the detected verification code, and generates a comparison result. The verification code comparator 10 detects whether the protected document is altered from the original document based on the comparison result. The output device 16 outputs the comparison result.

The protected document provider 17 includes any kind of reading device capable of reading a protected document or any kind of storage device capable of storing a protected document.

With the protected document provider 17 and the output device 16, the image processing apparatus 42 may form an image processing system 41, capable of detecting document alteration of a protected document having a set of verification codes.

Figure 12:
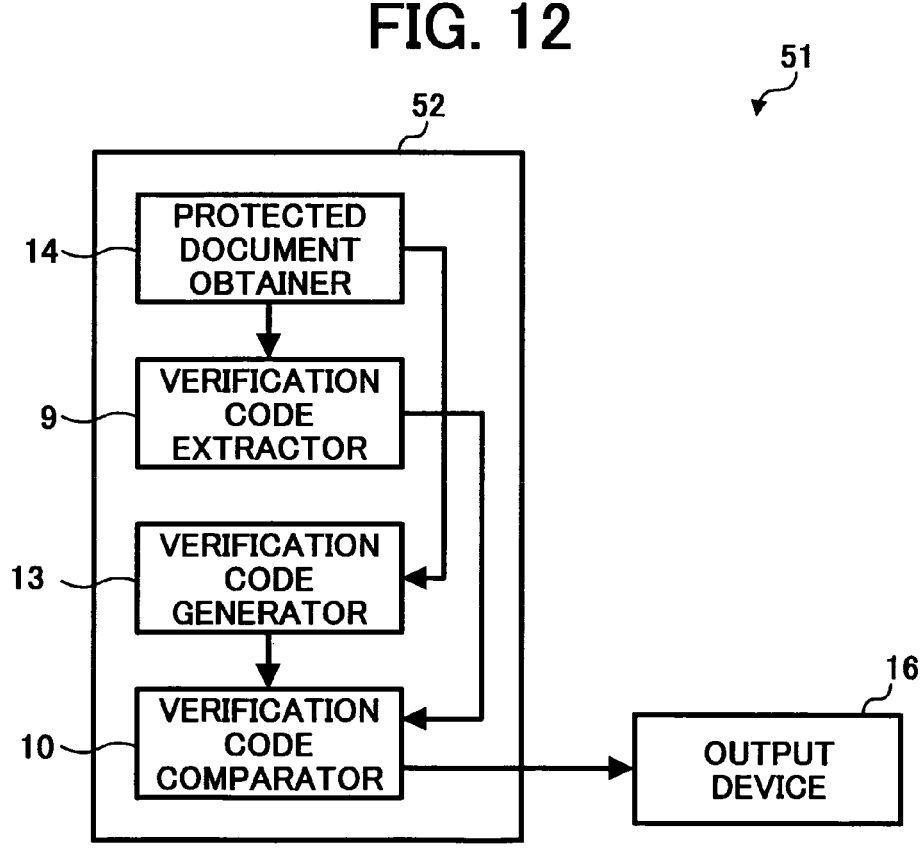
FIG. 12 is a block diagram illustrating a functional structure of an image processing system according to another preferred embodiment of the present invention.

The image processing apparatus 52 shown in FIG. 12 is substantially similar to the image processing apparatus 42 of FIG. 11, except for the addition of a protected document obtainer 14. The protected document obtainer 14 obtains a protected document from the outside. In other words, the image processing apparatus 52 and the output device 16 may form an image processing system 51, which functions similarly to the image processing system 41.

Figure 13:
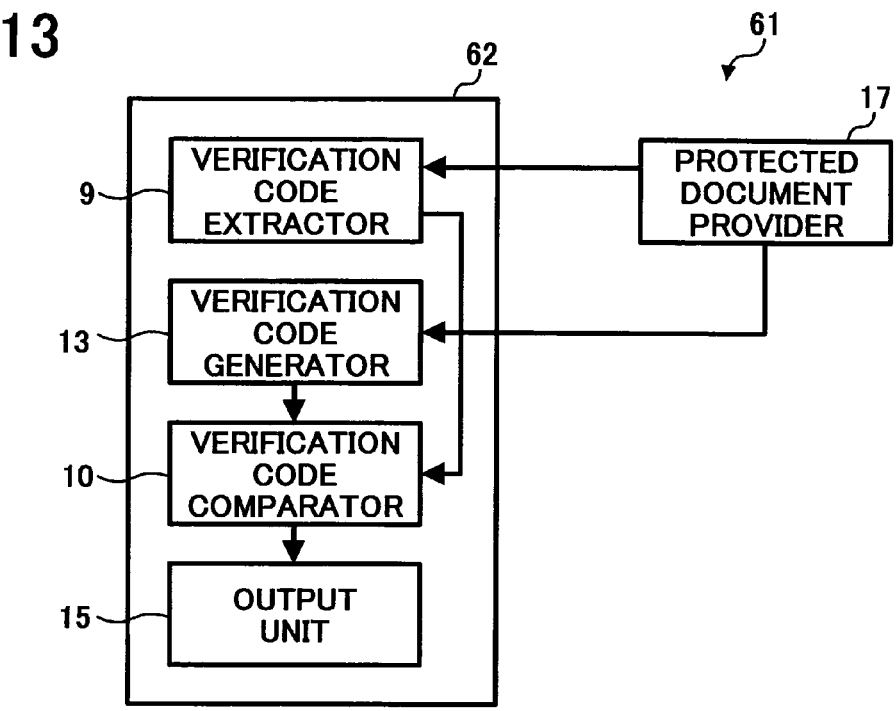
FIG. 13 is a block diagram illustrating a functional structure of an image processing system according to another preferred embodiment of the present invention.

The image processing apparatus 62 shown in FIG. 13 is substantially similar to the image processing apparatus 42 of FIG. 11, except for the addition of an output unit 15. The output unit 15 outputs a comparison result. In other words, the image processing apparatus 62 and the protected document provider 17 may form an image processing system 61, which functions similarly to the image processing system 41.

Figure 14:
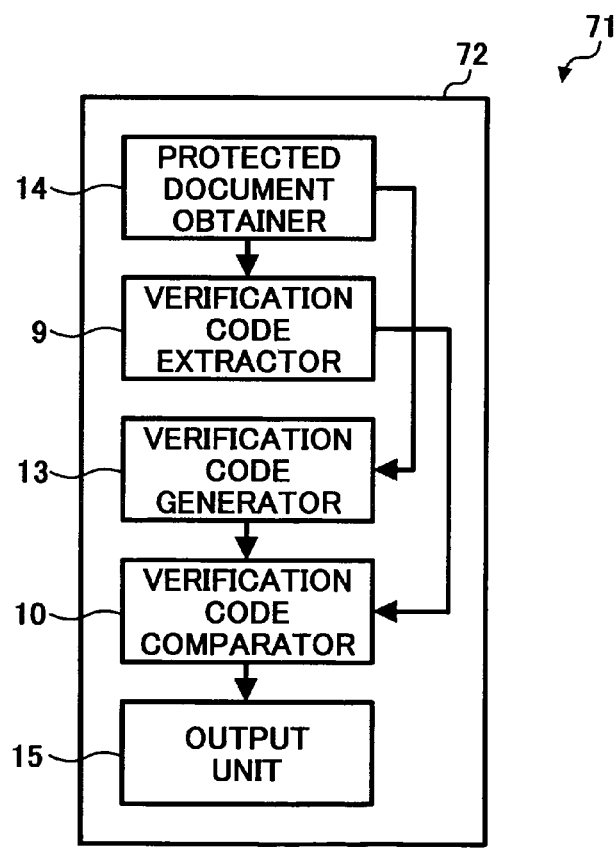
FIG. 14 is a block diagram illustrating a functional structure of an image processing system according to another preferred embodiment of the present invention.

Referring to FIG. 14, the image processing apparatus 72 includes the protected document obtainer 14, the verification code extractor 9, the verification code generator 13, the verification code comparator 10, and the output unit 15. Thus, the image processing apparatus 72 may form an image processing system 71, which functions similarly to any one of the image processing systems 41, 51 and 61.

Figure 15:
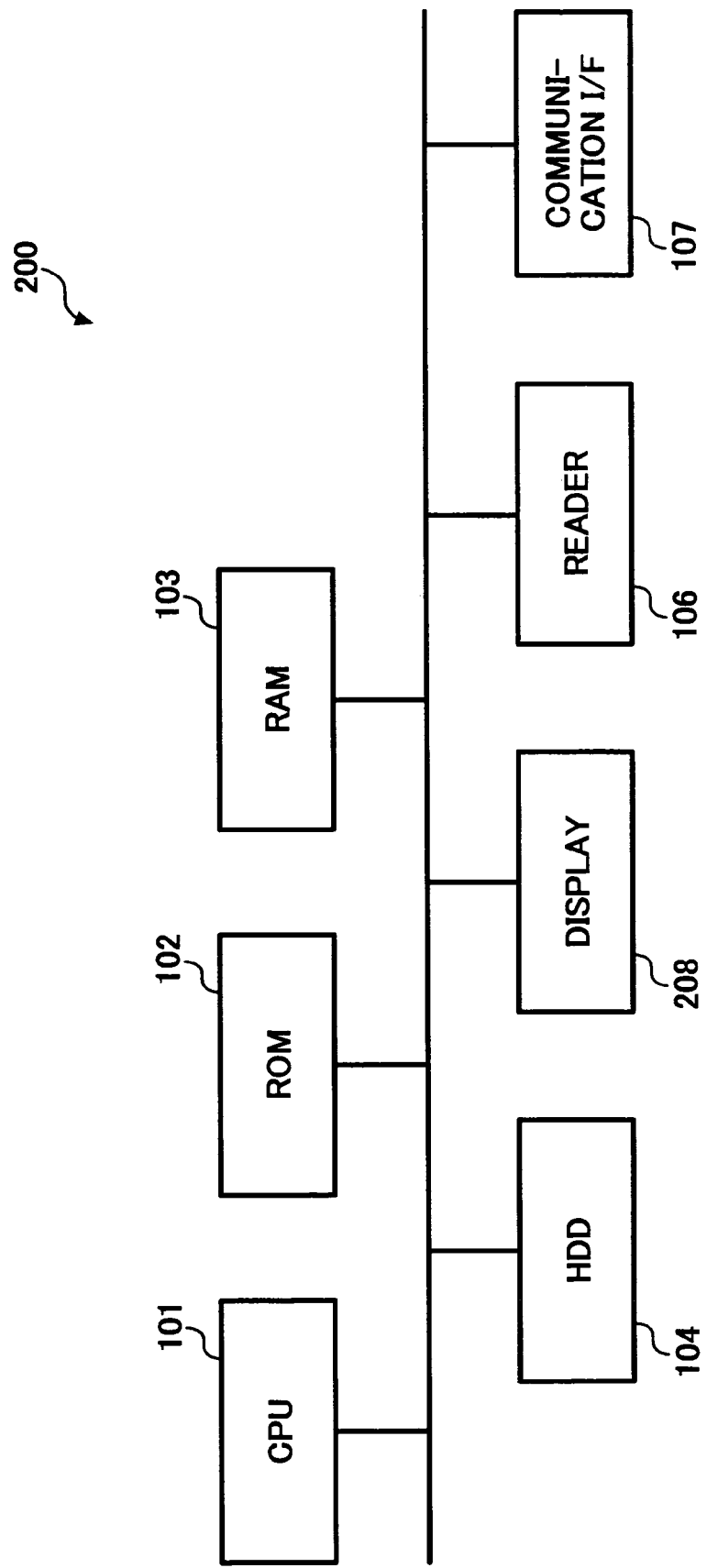
FIG. 15 is a block diagram illustrating a hardware structure of an image processing system according to another preferred embodiment of the present invention.

The above-described and other image processing systems, capable of detecting document alteration of a protected document having a set of verification codes, may be implemented in various ways. FIG. 15 illustrates one preferred implementation. As shown in FIG. 15, an image processing system 200 is substantially similar in configuration to the image processing system 100 of FIG. 5, except that the printer 105 is replaced with a display 208. However, the image processing system 200 may additionally include the printer 105 or it may replace the display 208 with the printer 105.

The CPU 101 controls an entire operation of the image processing system 200. The ROM 102 functions as a memory providing faster access to the CPU 101. The RAM 103 functions as a work memory for the CPU 101.

The reader 106 obtains or provides a protected document in a similar manner as described referring to FIG. 5. Further, the reader 106 may additionally include a barcode reader, in addition to the devices listed referring to FIG. 5.

The display 208 includes any kind of display device or monitor, capable of displaying the comparison result. In addition, the display 207 may display instructions given by the CPU 101, the protected document read by the reader 106, etc. Examples of the display include a CRT and an LCD.

The communication I/F 107 may be optionally provided to allow the image processing system 200 to communicate with other apparatus or system via a communication line or a network.

The HDD 104 preferably stores the verification code generating program of the present invention, and a verification code comparator program of the present invention. It may additionally store other computer programs to be used by the CPU 101. Such programs include, for example, a protected document obtainer program such as a reader program to be used for controlling the reader 106 and a communication program to be used for controlling the communication I/F 107, a verification code extractor program such as a barcode reader program to be used for controlling the barcode reader, and an outputting program such as a display program to be used for controlling the display 208.

In operation, the image processing system 200 may load the verification code generator program and the verification code comparator program, with or without one of the other programs, from the HDD 104 onto the RAM 103. The system 200 then instructs the CPU 101 or any other device in the system 200 to operate according to the loaded programs. In this way, the image processing system 200 may operate as any one of the above-described and other image processing systems of the present invention, capable of detecting document alteration using a verification code.

Alternatively, the programs of the present invention and/or other programs may be previously stored in any kind of computer-readable medium, such as CDs, DVDs, a floppy disk, an magneto-optical disk, for example. Further, the programs of the present invention and/or other programs may be previously stored in the outside of the image processing system 200, and may be downloaded through a network or a communication line using the communication I/F 107.

Further, as described referring to FIG. 5, the image processing system 200 may additionally include any kind of peripheral devices.

Figure 16:
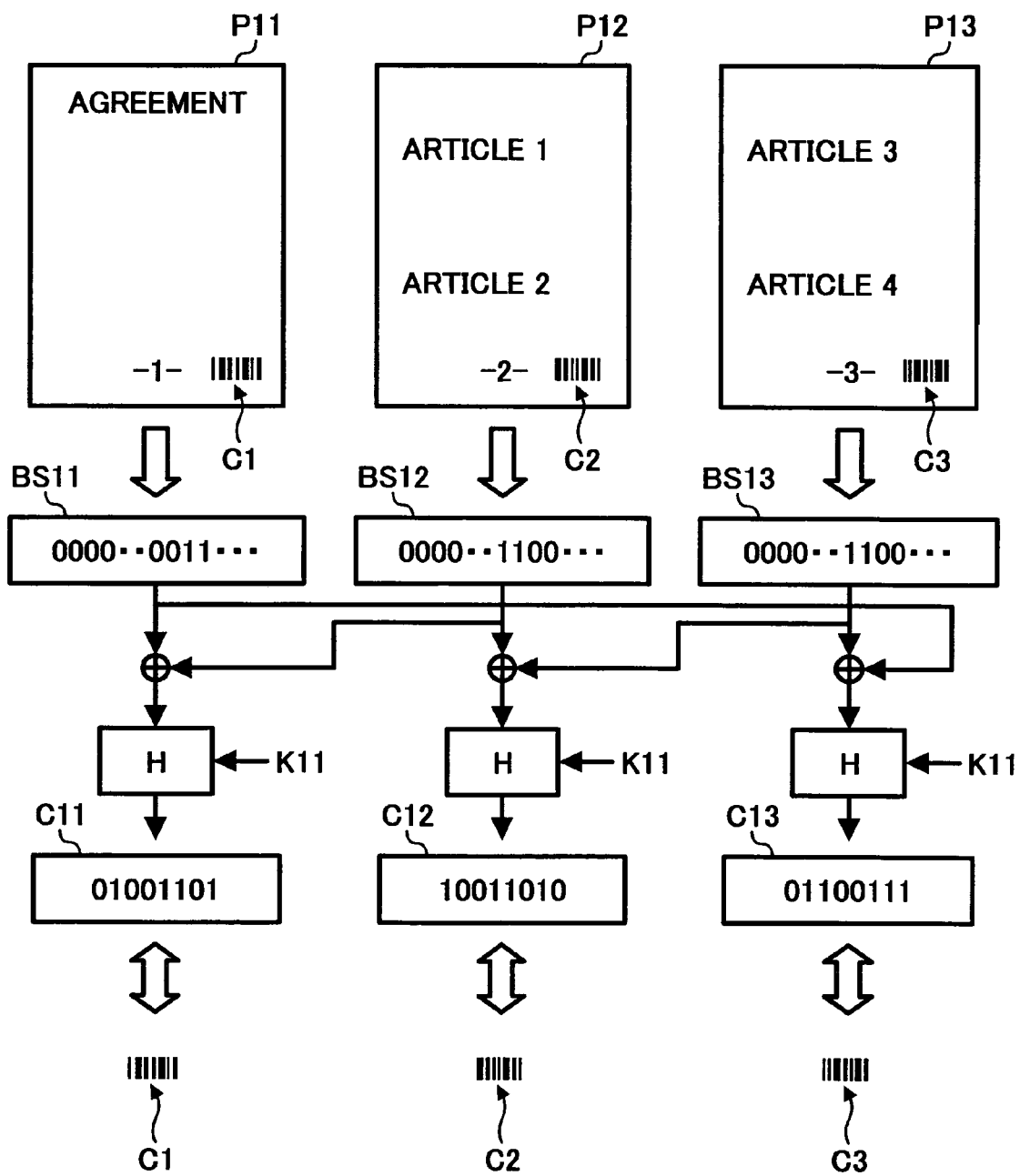
FIG. 16 is an illustration explaining an exemplary operation of detecting document alteration according to a preferred embodiment of the present invention.

Referring now to FIG. 16, detecting document alteration of a protected document having a set of verification codes is explained.

This exemplary case assumes that a protected document has been generated, using the cryptography shown in FIG. 10. However, the image processing system 200 is applicable to any other cryptography used in the art.

The image processing system 200 obtains a protected document to be processed. The protected document is preferably a confidential document, including a plurality of protected images arranged in a sequential order, with each protected image having a verification code.

This exemplary case uses a protected document of FIG. 16, which is supposed to be generated based on the original document of FIG. 6. Accordingly, the first protected image P11 is assumed to be generated based on the first original image D1. The second protected image P12 is assumed to be generated based on the second original image D2. The third protected image P13 is assumed to be generated based on the third original image D3.

Accordingly, the first protected image P11 preferably has the first verification code C1. The second protected image P12 preferably has the second verification code C2. The third protected image P13 preferably has the third verification code C3.

In operation, the image processing system 200 extracts the first verification code C1 from the first protected image P11, the second verification code C2 from the second protected image P12, and the third verification code C3 from the third protected image P13. To extract the verification codes C1 to C3, the image processing system 200 may use the barcode reader, for example.

The image processing system 200 generates first, second, and third bit sequences BS11, BS12, and BS13, and further generates verification codes C11, C12, and C13, respectively, in a substantially similar manner as described referring to FIG. 10. In this case, the hash value H and the key K11 are previously provided.

The image processing system 200 compares the generate verification codes C11, C12, and C13, respectively with the detected or original verification codes C1, C2, and C3, and generates a comparison result indicating each comparison.

Based on the comparison result, the image processing system 200 determines whether the protected document has been altered.

For determination, the comparison result may be output for display. For example, the image processing system 200 may resize each protected image into a thumbnail image, and indicates the image being altered by blinking the image or highlighting the image with color.

Figure 17:
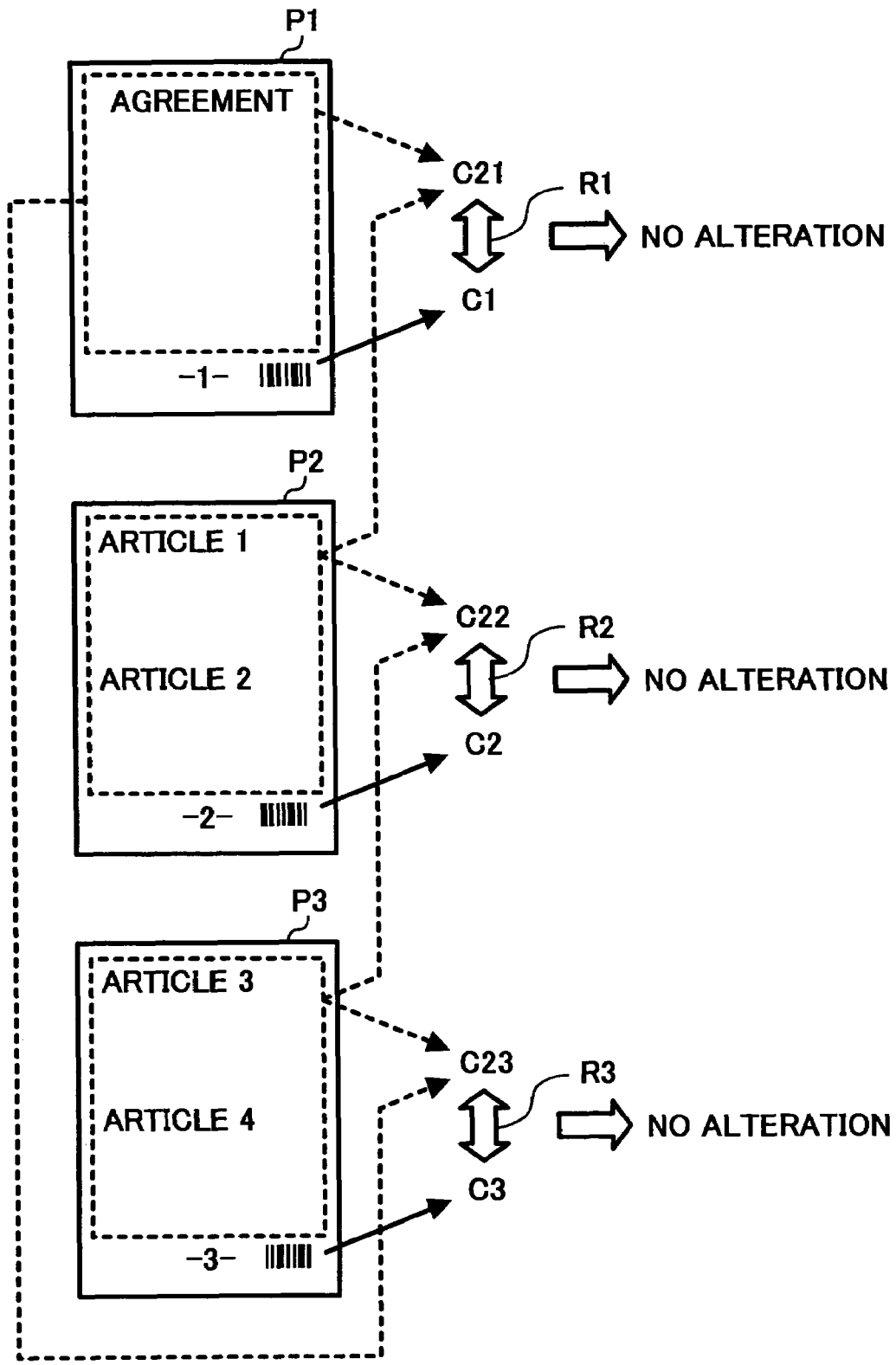
FIG. 17 is an illustration explaining an exemplary operation of detecting document alteration according to another preferred embodiment of the present invention.
Figure 18:
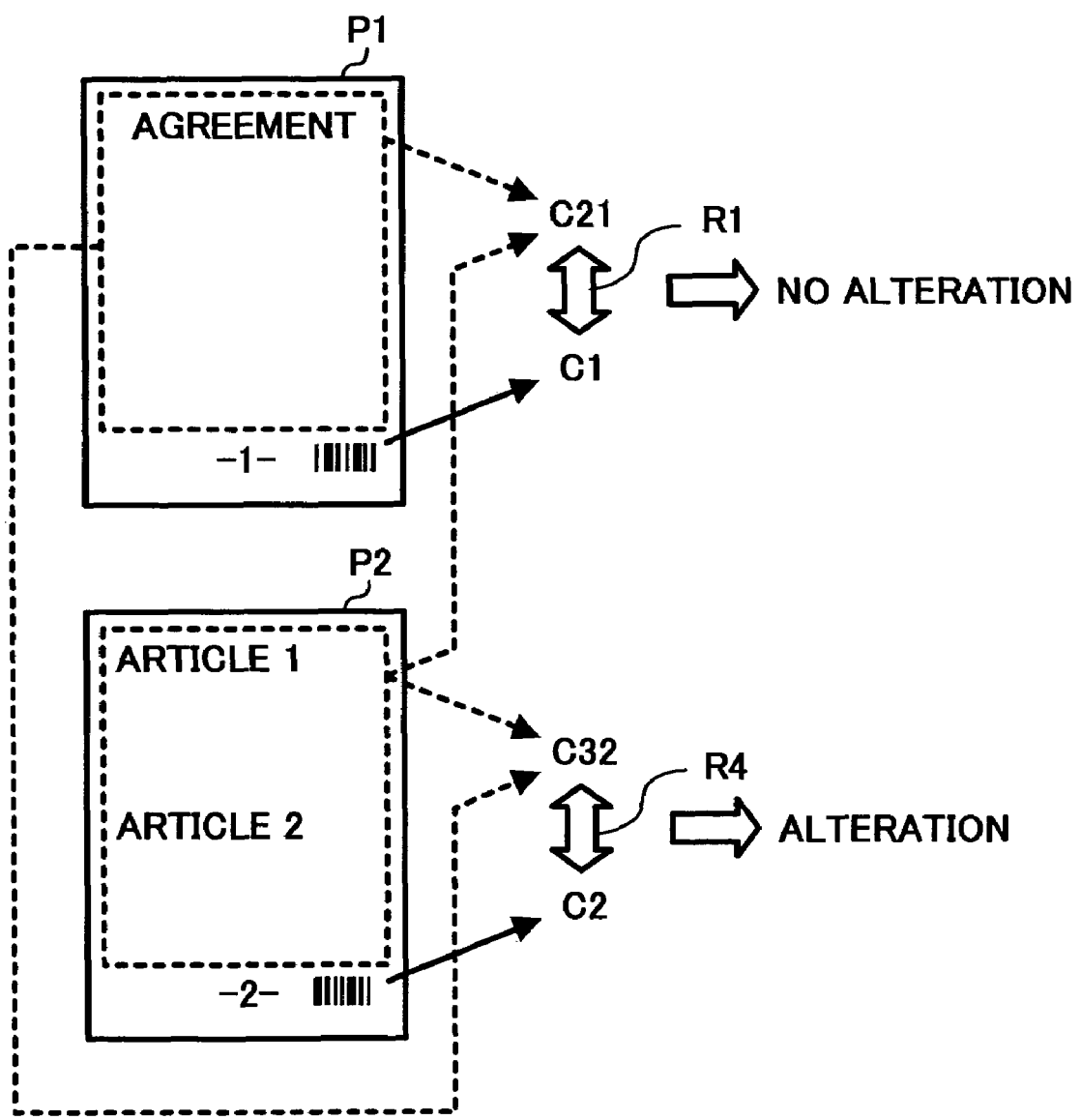
FIG. 18 is an illustration explaining an exemplary operation of detecting document alteration according to another preferred embodiment of the present invention.
Figure 19:
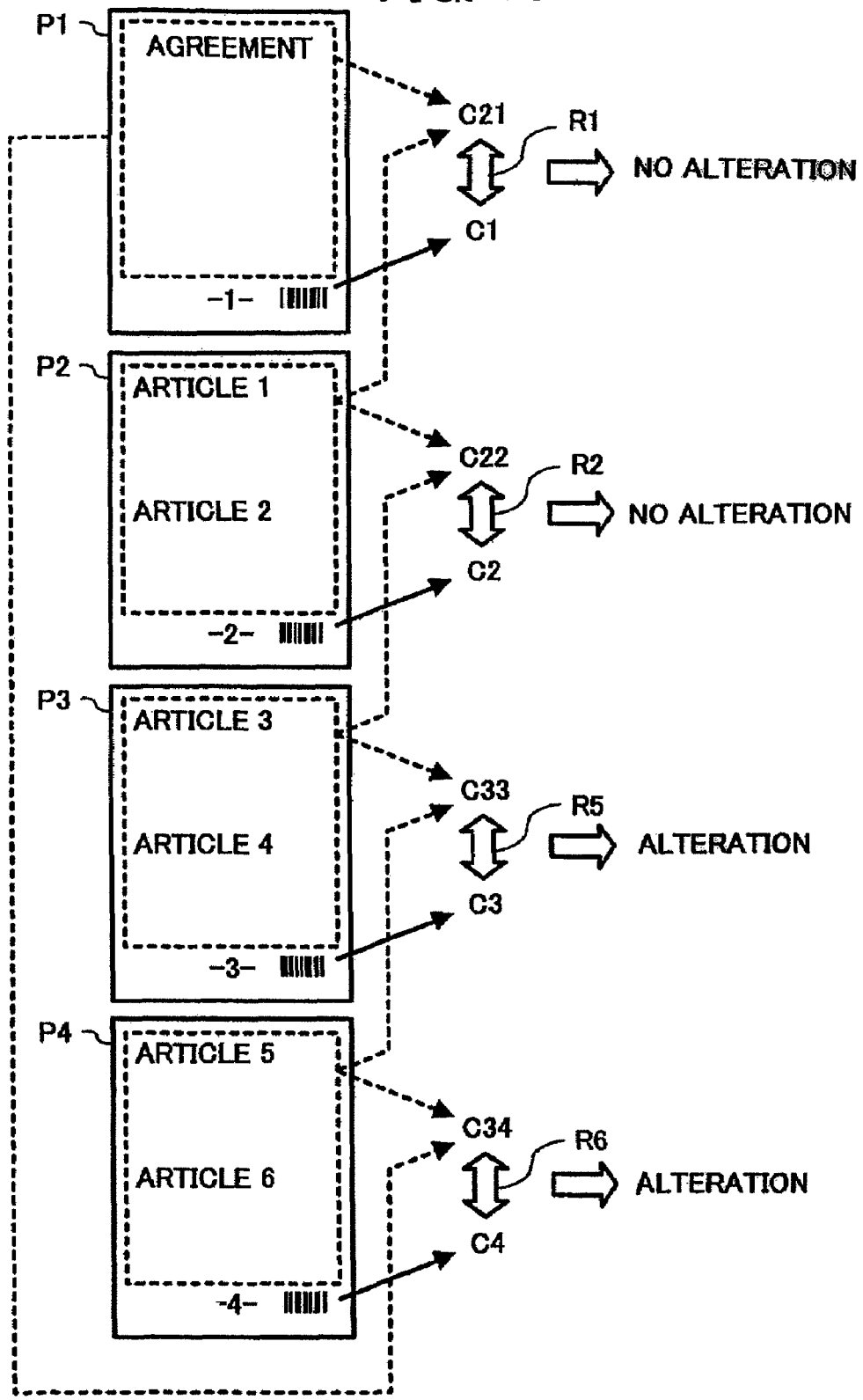
FIG. 19 is an illustration explaining an exemplary operation of detecting document alteration according to another preferred embodiment of the present invention.

FIGS. 17 to 19 illustrate various cases of detecting document alteration. Specifically, FIG. 17 illustrates an exemplary case of detecting no document alteration. FIGS. 18 and 19 illustrate exemplary cases of detecting document alteration. These exemplary cases also assume that the protected document has been generated based on the original document shown in FIG. 6.

In the example illustrated in FIG. 17, the image processing system 200 obtains a protected document, which is substantially similar to the one shown in FIG. 7.

The image processing system 200 extracts the first to third verification codes C1 to C3, respectively.

The image processing system 200 then generates first to third verification codes C21 to C23, respectively. The first verification code C21 is generated based on the first and second protected images P1 and P2. The second verification code C22 is generated based on the second and third protected images P2 and P3. The third verification code C23 is generated based on the first and third protected images P1 and P3.

To detect document alteration, the image processing system 200 compares the generated verification code C21 with the detected or original verification code C1, and generates a comparison result R1. The comparison result R1 indicates that the verification codes C1 and C21 correspond to each other. Based on the comparison result R1, the image processing system 200 determines that there is no document alteration between the first protected image P1 and the second protected image P2.

Similarly, the image processing system 200 compares the generated verification code C22 with the detected or original verification code C2, and generates a comparison result R2. The comparison result R2 indicates that the verification codes C2 and C22 correspond to each other. Based on the comparison result R2, the image processing system 200 determines that there is no document alteration between the second protected image P2 and the third protected image P3.

Further, the image processing system compares the generated verification code C23 with the detected or original verification code C3, and generates a comparison result R3. The comparison result R3 indicates that the verification codes C3 and C23 correspond to each other. Based on the comparison result R3, the image processing system determines that there is no document alteration between the first protected image P1 and the third protected image P3.

In another example illustrated in FIG. 18, the image processing system 200 receives a protected document having the first protected image P1 of FIG. 7 and the second protected image P2 of FIG. 7, but not the third protected image P3 of FIG. 7, i.e. the third protected image has been deleted, lost, or replaced.

Before comparison, the image processing system 200 extracts the first and second verification codes C1 and C2.

Further, the image processing system 200 generates a verification code C21 based on the first and second protected images P1 and P2, and a verification code C32 based on the first and second protected images P1 and P2.

The image processing system 200 compares the generated verification code C21 with the detected or original verification code C1, and generates a comparison result R1, indicating their correspondence. Based on the comparison result R1, the image processing system 200 determines that there is no document alteration between the first protected image P1 and the second protected image P2.

Similarly, the image processing system 200 compares the generated verification code C32 with the detected or original verification code C2, and generates a comparison result R4, indicating their incorrespondence. Based on the comparison result R4, the image processing system 200 determines that there is document alteration between the second protected image P2 and the protected image succeeding the second protected image P2.

In another example illustrated in FIG. 19, the image processing system 200 receives a protected document having the first protected image P1 of FIG. 7, the second protected image P2 of FIG. 7, the third protected image P3 of FIG. 7, and a fourth protected image P4, i.e. the fourth protected image P4 has been added or replaced.

Before comparison, the image processing system 200 extracts the first to third verification codes C1, C2, and C3, and a fourth verification code C4. The fourth verification code C4 is newly generated as a forged verification code.

Next, the image processing system 200 generates first to fourth verification codes C21, C22, C33, and C34. The first verification code C21 is generated based on the first and second protected images P1 and P2. The second verification code C22 is generated based on the second and third protected images P2 and P3. The third verification code C33 is generated based on the third and fourth protected images P3 and P4. The fourth verification code C34 is generated based on the first and fourth protected images P1 and P4.

To detect document alteration, the image processing system 200 compares the generated verification code C21 with the detected or original verification code C1, and generates a comparison result R1, indicating their correspondence. Based on the comparison result R1, the image processing system 200 determines that there is no document alteration between the first protected image P1 and the second protected image P2.

Similarly, the image processing system 200 compares the generated verification code C22 with the detected or original verification code C2, generates a comparison result R2, indicating their correspondence, and determines that there is no document alteration between the second protected image P2 and the third protected image P3.

Further, the image processing system 200 compares the generated verification code C33 with the detected or original verification code C3, and generates a comparison result R5, indicating their correspondence. Based on the comparison result R5, the image processing system 200 determines that there is document alteration between the third protected image P3 and the fourth protected image P4.

Furthermore, the image processing system 200 compares the generated verification code C34 with the detected or forged verification code C4, and generates a comparison result R6, indicating their correspondence. Based on the comparison result R6, the image processing system 200 determines that there is document alteration between the fourth protected image P4 and the protected image succeeding the fourth protected image P4.

In this exemplary case, however, the image processing system 200 may not be able to extract the verification code C4, which is forged or false. Further, the image processing system 200 may be able to determine that the verification code C4 is forged, by comparing the set of generated verification data directly with the set of original verification data, for example.

Any one of the image processing apparatus or systems according to the above-described embodiments generates a verification code that is visible. However, the visible verification code may be vulnerable to document alteration, as it can be easily taken out, erased, or forged.

Figure 20:
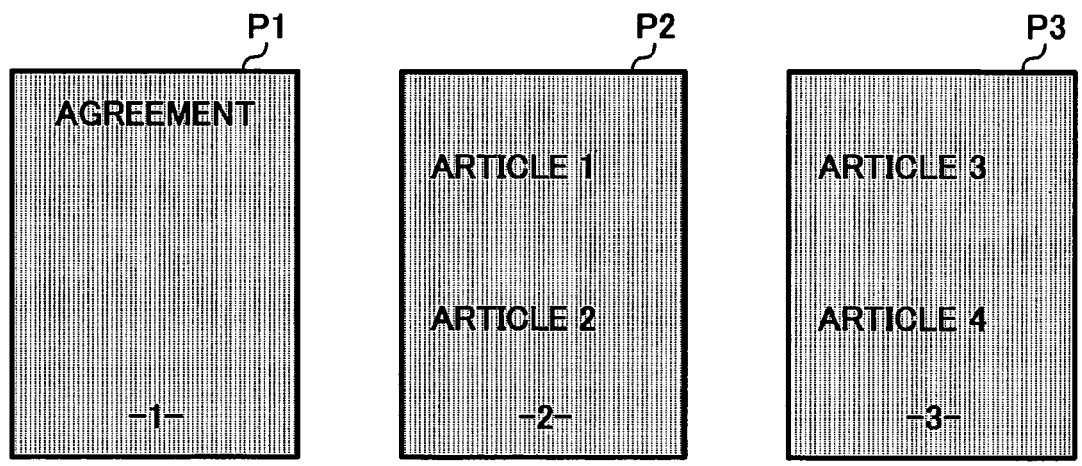
FIG. 20 is an exemplary protected document generated based on the exemplary original document of FIG. 6, according to another preferred embodiment of the present invention.

To further increase protection of the protected document, a verification code may be embedded into a background portion of an original document as a verification pattern, as illustrated in FIG. 20. This embedding may be performed by an image processing apparatus 82 shown in FIG. 21, for example.

The image processing apparatus 82 includes a verification pattern generator 83 and a verification pattern adder 84. The verification pattern generator 83 is coupled to the original document provider 5. The verification pattern adder 84 is coupled to the output device 6.

The verification pattern generator 83 generates a set of verification patterns from the original document, and sends it to the verification pattern adder 84. The verification pattern adder 84 embeds the set of verification patterns to a background portion of the original document, and sends it to the output device 6 as a protected document. With the original document provider 5 and the output device 6, the image processing apparatus 82 may form an image processing system 81, capable of generating a protected document having a set of verification patterns.

Figure 21:
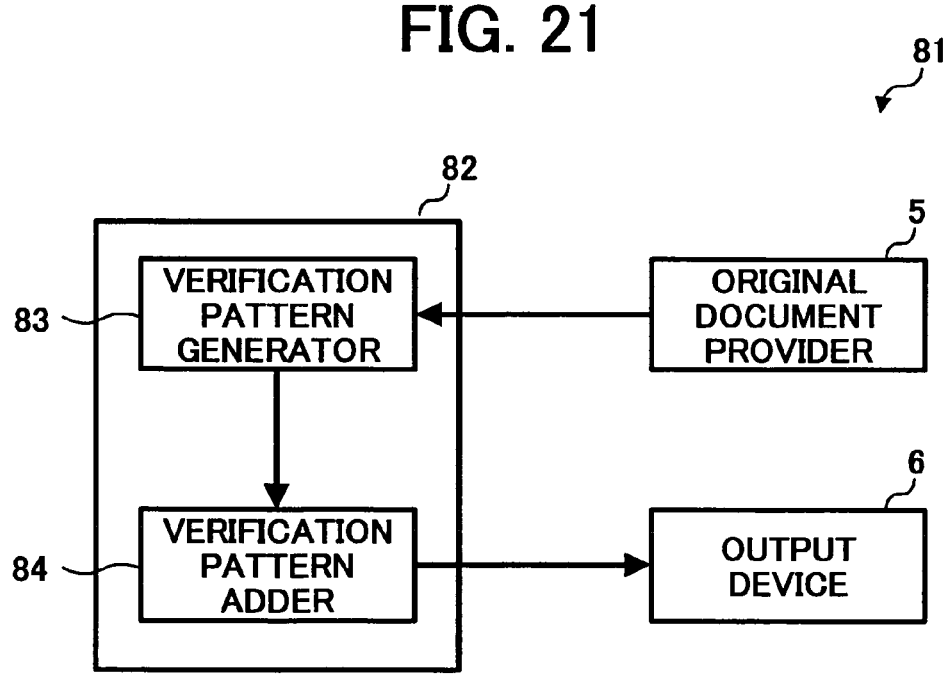
FIG. 21 is a block diagram illustrating a functional structure of an image processing system according to another preferred embodiment of the present invention.

In addition to the configuration shown in FIG. 21, the image processing system 81 may be implemented in other ways, in a similar manner as described in the case of the image processing systems shown in FIGS. 1 to 4. Further, the image processing system 81 may be implemented to have a configuration substantially similar to the one shown in FIG. 5. In this case, however, the HDD 104 stores a verification pattern generating program and a verification pattern adding program, instead of the verification code generating program and the verification code adding program.

Figure 22:
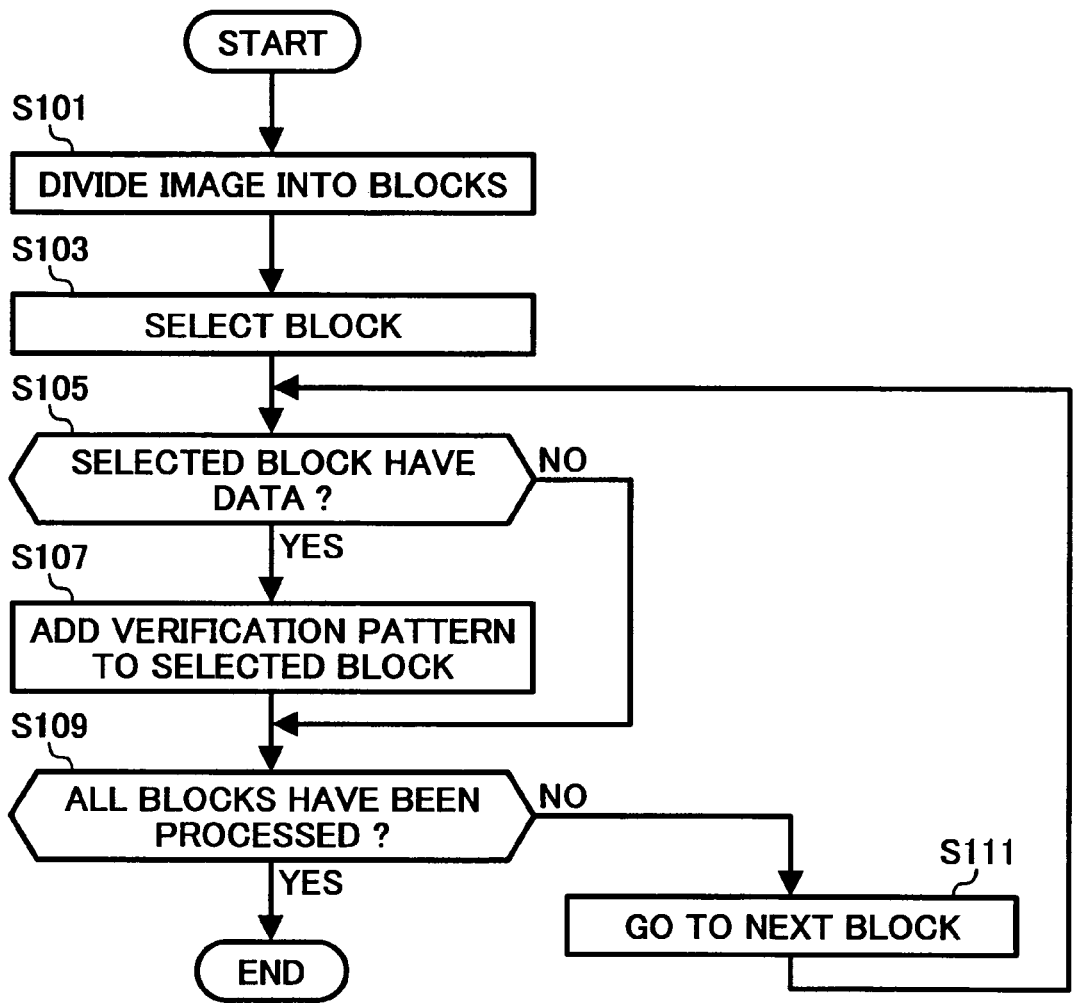
FIG. 22 is a flowchart illustrating an exemplary operation of embedding a verification pattern according to a preferred embodiment of the present invention.
Figure 23:
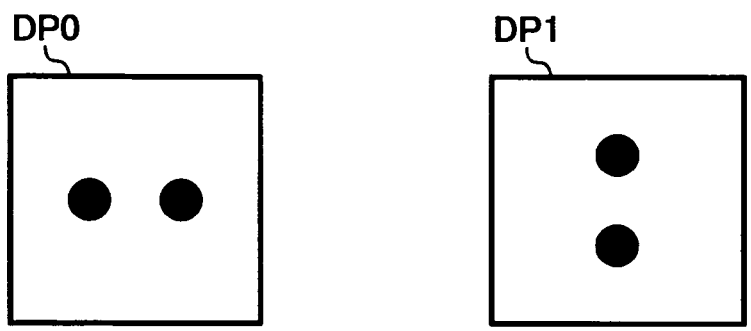
FIG. 23 is an illustration showing exemplary dot patterns included in the verification pattern of FIG. 22 according to a preferred embodiment of the present invention.

Referring to FIG. 22, a description is made of generating a verification pattern.

Step S101 selects an original image to be processed, and divides the original image into a plurality of blocks, as shown in FIG. 8A.

S103 selects a block to be processed.

Step S105 determines whether the selected block has image data thereon or close thereto. If yes, the process moves to Step S107, otherwise, the process moves to Step S109.

Step S107 generates a verification pattern, and adds the verification pattern to the selected block.

Step S109 determines whether all blocks in the original image have been processed. If yes, the process ends, otherwise, the process moves to Step S111.

Step S111 selects a next block to be processed, and the process further moves to Step S105.

To generate a verification pattern, the image processing system 81 first generates a verification code in a substantially similar manner described referring to FIGS. 8 to 10. The verification code, which may be expressed as a binary number containing 0s and 1s, is converted to a verification pattern, including two dot patterns DP0 and DP1 shown in FIG. 23. The first dot pattern DP0 of FIG. 23, having two dots horizontally aligned, corresponds to the binary value 0. The second dot pattern DP1 of FIG. 23, having two dots vertically aligned, corresponds to the binary value 1. However, the present invention is not limited to this example, as long as they are distinguishable from each other. Further, the size of dot may be previously determined, depending on various factors including the desired level of protection, for example.

Figure 24:
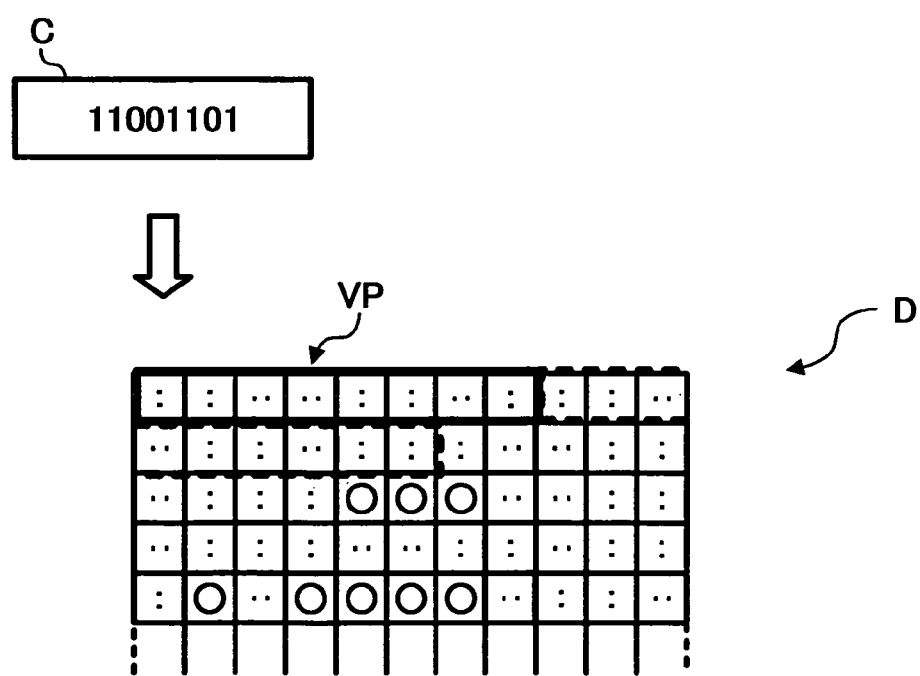
FIG. 24 is an illustration explaining an exemplary operation of embedding the verification pattern of FIG. 22.

FIG. 24 illustrates an exemplary case of generating a verification pattern from a verification code C of an original image D. The verification code C, including "11001101", is converted to a verification pattern VP, containing a set of first dot patterns DP0 and second dot patterns DP1.

Each of the dot patterns DP0 or DP1 is then embedded in the corresponding block of the original image D. In other words, the second dot pattern DP1 is embedded into a first block of the original image. The second dot pattern DP1 is again embedded into a second block of the original image. The first dot pattern is then embedded into a third block of the original image, and so on. Once all the dot patterns are embedded, the verification pattern is embedded for another time to fill in the remaining blocks of the background portion of the original image.

Alternatively, the verification pattern may be embedded into a verification area of the background portion. In such a case, the image processing system 81 is previously provided with a verification area designator, which defines the verification area.

Figure 25:
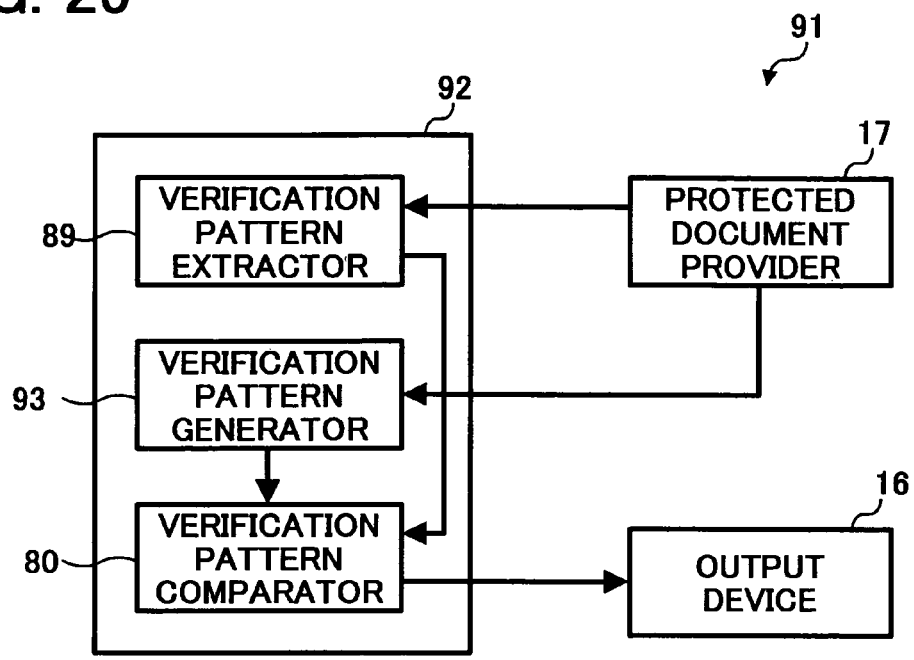
FIG. 25 is a block diagram illustrating a functional structure of an image processing system according to a preferred embodiment of the present invention.

Referring now to FIG. 25, an image processing apparatus 92 according to another preferred embodiment of the present invention is explained. The image processing apparatus 92 is capable of detecting document alteration of a protected document, using a set of verification patterns extracted from the protected document.

The image processing apparatus 92 includes a verification pattern extractor 89, a verification pattern generator 93, and a verification pattern comparator 80. The verification pattern extractor 89 is coupled to the protected document provider 17. The verification pattern comparator 80 is coupled to the output device 16.

The verification pattern extractor 89 extracts a set of verification patterns ("detected verification patterns") from the protected document. For example, the verification pattern extractor 89 selects a protected image from the protected document, and further selects a block to be processed. If the block contains any one of the dot patterns DP0 and DP1, the verification pattern extractor 89 extracts it, and moves to a next block to be processed. In this way, the verification pattern containing the dot patterns DP0 and DP1 can be extracted for the selected protected image, and sent it to the verification pattern comparator 80.

The verification pattern generator 93 generates a set of verification patterns ("generated verification patterns") from the protected document, in a substantially similar manner performed by the verification pattern generator 83 of FIG. 21.

The verification pattern comparator 80 compares the generated verification pattern with the detected verification pattern, and generates a comparison result. Based on the comparison result, the verification pattern comparator 80 detects whether the protected document is altered.

With the protected document provider 17 and the output device 16, the image processing apparatus 92 may form an image processing system 91, capable of detecting document alteration of a protected document having a set of verification patterns.

In addition to the structure shown in FIG. 25, the image processing system 91 may be implemented in other ways, in a similar manner as described in the case of the image processing systems shown in FIGS. 11 to 14. Further, the image processing system 91 may be implemented to have a configuration substantially similar to the one shown in FIG. 15. However, in this exemplary case, the HDD 104 preferably stores the verification pattern generating program and a verification pattern comparing program, instead of the verification code generating program and the verification code comparing program.

Alternatively, if the verification pattern is embedded only in the verification area, the image processing system 91 may select the verification area, and detects whether the verification area has been altered. In such a case, a verification area detector may be previously provided.

Further, a set of detected verification patterns may be compared directly with a set of original verification patterns.

Figure 26:
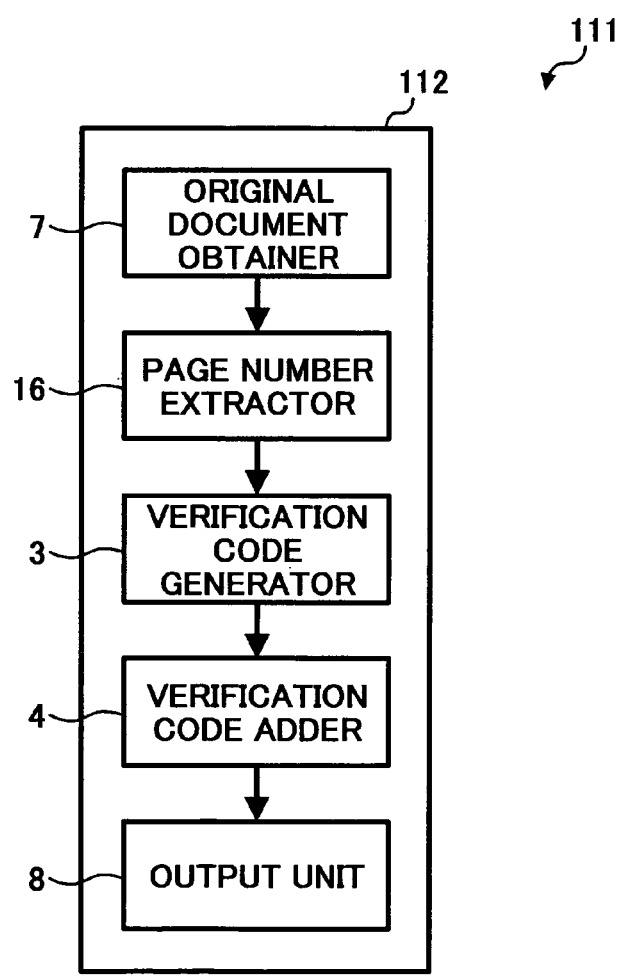
FIG. 26 is a block diagram illustrating a functional structure of an image processing system according to a preferred embodiment of the present invention.

Referring now to FIG. 26, an image processing apparatus 112 according to another preferred embodiment of the present invention is explained.

The image processing apparatus 112 is capable of generating a verification code having page number data. With the addition of page number data, the verification code can be used not only to detect document alteration, but also to detect a specific portion being altered.

The image processing apparatus 112 includes the original document obtainer 7, a page number extractor 16, the verification code generator 3, the verification code adder 4, and the output unit 8.

The original document obtainer 7 obtains an original document to be processed, which includes a plurality of original images. The page number extractor 16 extracts a page number previously assigned to each of the original images. Using information contained in the original document and the page number being extracted, the verification code generator 3 generates a verification code, as illustrated in FIG. 27.

Figure 27:
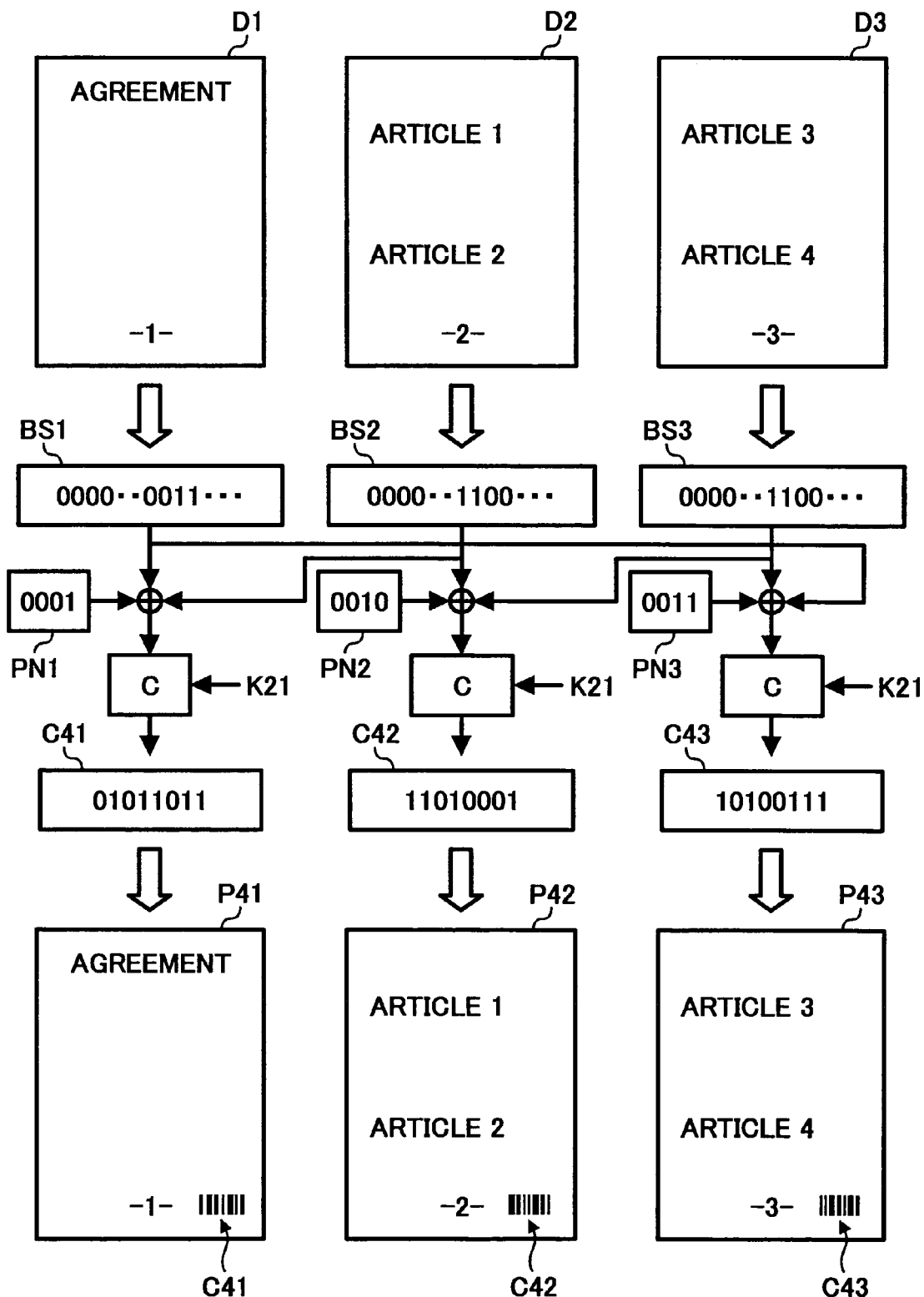
FIG. 27 is an illustration explaining an exemplary operation of generating a verification code having page number data according to a preferred embodiment of the present invention.

As shown in FIG. 27, the verification code generator 3 generates first to third bit sequences BS1 to BS3, in a substantially similar manner as described referring to FIG. 8.

Further, the verification code generator 3 receives first page number data PN1 indicating the page number assigned to the first original image D1, second page number data PN2 indicating the page number assigned to the second original image D2, and third page number data PN3 indicating the page number assigned to the third original image D3.

To generate a first verification code C41, the verification code generator 3 combines the first bit sequence BS1, the second bit sequence BS2, and the first page number data PN1 into a combined bit sequence. The verification code generator 3 obtains a digest value of the combined bit sequence using a function C previously provided, and encodes the digest value with a key K21.

Similarly, to generate a second verification code C42, the verification code generator 3 combines the second bit sequence BS2, the third bit sequence BS3, and the second page number data PN2 into a combined bit sequence. The verification code generator 3 obtains a digest value of the combined bit sequence using the function C, and encodes the digest value with the key K21.

Further, to generate a third verification code C43, the verification code generator 3 combines the first bit sequence BS1, the third bit sequence BS3, and the third page number data PN3, into the combined bit sequence. The verification code generator 3 obtains a digest value of the combined bit sequence using the function C, and encodes the digest value with the key K21.

The verification code adder 4 adds the verification codes C41 to C43 to the first to third original images D1 to D3, respectively. In this way, a protected document having first to third original images P41 to P43 is generated.

This exemplary case adds the page number data before generating the combined bit sequence, however, the page number data may be added after generating the combined bit sequence, for example, during the encoding process.

The image processing apparatus 112 may form an image processing system 111, capable of generating a protected document having a set of verification codes having page number data. The image processing system 121 may be implemented in other ways, in a similar manner as described in the case of the image processing systems shown in FIGS. 1 to 4. Further, the image processing system 121 may be implemented to have a configuration substantially similar to the one shown in FIG. 5. However, in this case, the HDD 104 stores a page number data extracting program, in addition to the verification code generating program and the verification code adding program.

Figure 28:
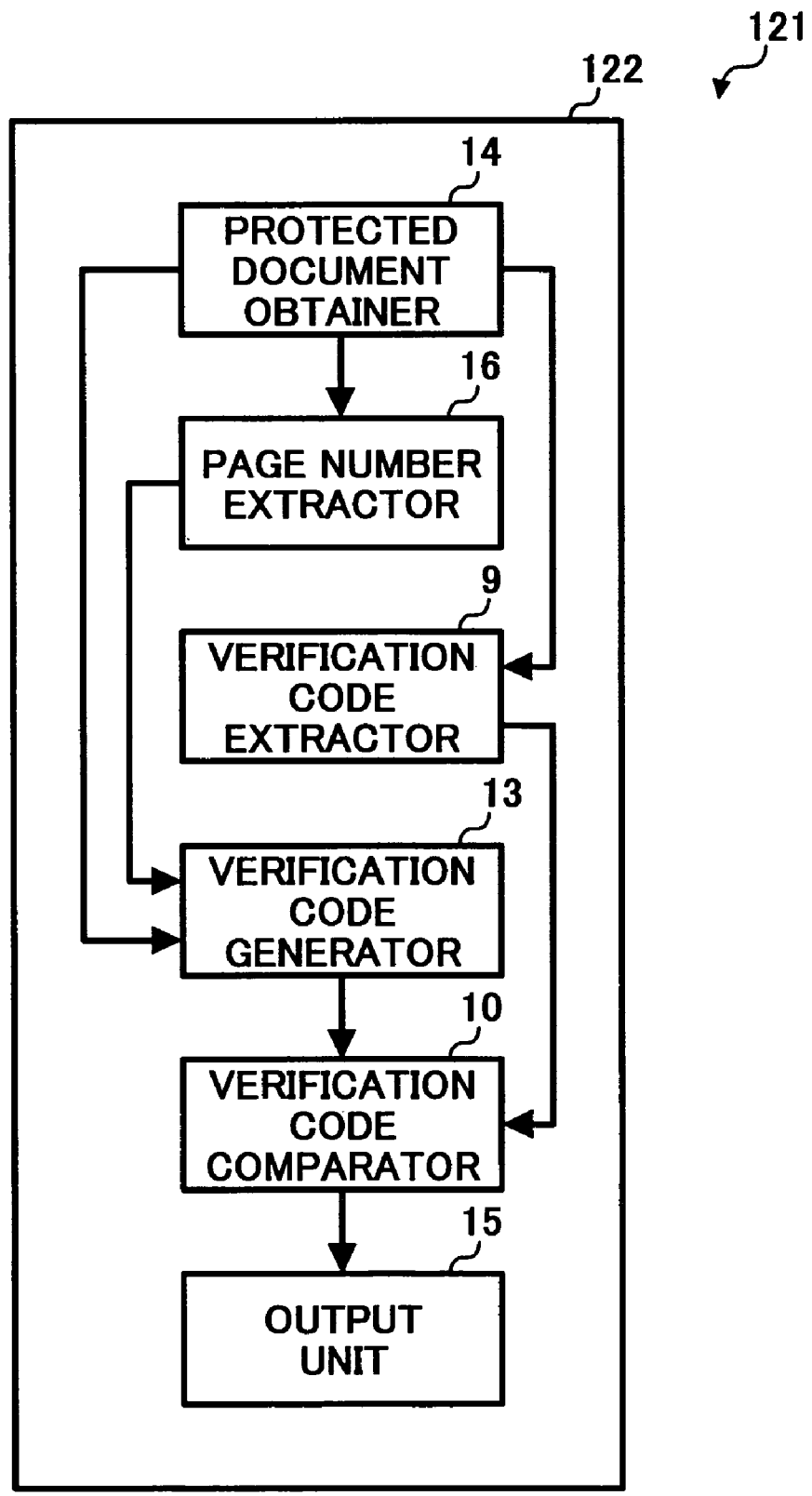
FIG. 28 is a block diagram illustrating a functional structure of an image processing system according to a preferred embodiment of the present invention.

The protected document shown in FIG. 27 may be verified by an image processing apparatus 122 shown in FIG. 28, for example.

The image processing apparatus 122 includes the protected document obtainer 14, the page number extractor 16, the verification code extractor 9, the verification code generator 13, the verification code comparator 10, and the output unit 15.

In operation, the protected document provider 17 provides a protected document to the verification code extractor 9, the page number extractor 16, and the verification code generator 13. The verification code extractor 9 extracts a verification code from the protected document, and sends it to the verification code comparator 10. The page number extractor 16 extracts page number data from the protected document, and sends it to the verification code generator 13. Based on the protected document and the page number data, the verification code generator 13 generates a verification code in a substantially similar manner performed by the verification code generator 3. The verification code comparator 10 compares the generated verification code with the detected verification code, and generates a comparison result. The verification code comparator 10 detects whether the protected document is altered based on the comparison result. More specifically, using the page number data included in the verification code, the original image being added, deleted, or replaced, may be detected. The output device 16 outputs the comparison result.

The image processing apparatus 122, which may form an image processing system 121 capable of detecting a specific portion of a protected document being altered, may be implemented in other ways, in a similar manner as described referring to the image processing systems shown in FIGS. 11 to 14. Further, the image processing system 121 may be implemented to have a configuration substantially similar to the one shown in FIG. 15. In such a case, the HDD 104 preferably includes the page number data extracting program, in addition to the verification code generating program and the verification code comparing program.

The above-described examples shown in FIGS. 26 to 28 illustrate the case of generating a verification code having page number data, or detecting document alteration using the verification code, however, the verification code may be further converted to a verification pattern having page number data.

Any one of the above-described and other image processing apparatus or systems, capable of generating a verification code or pattern, may be combined with any one of the above-described and other image processing apparatus or systems, capable of detecting document alteration using such code or pattern. Such combined systems may be implemented to have a configuration substantially similar to the one shown in FIG. 5 or 15, for example.

Next, referring to FIGS. 29 to 54, a description is made of image processing apparatus or system, capable of generating different kinds of verification patterns, or capable of detecting image alteration and unauthorized duplication, using the verification patterns. For example, the verification patterns include a tampering verification pattern for detecting image alteration and a copy verification pattern for detecting unauthorized duplication.

Referring now to FIGS. 29 to 32, image processing apparatus 212, 222, 232, and 242, capable of generating a tampering verification pattern and a copy verification pattern are explained.

Figure 29:
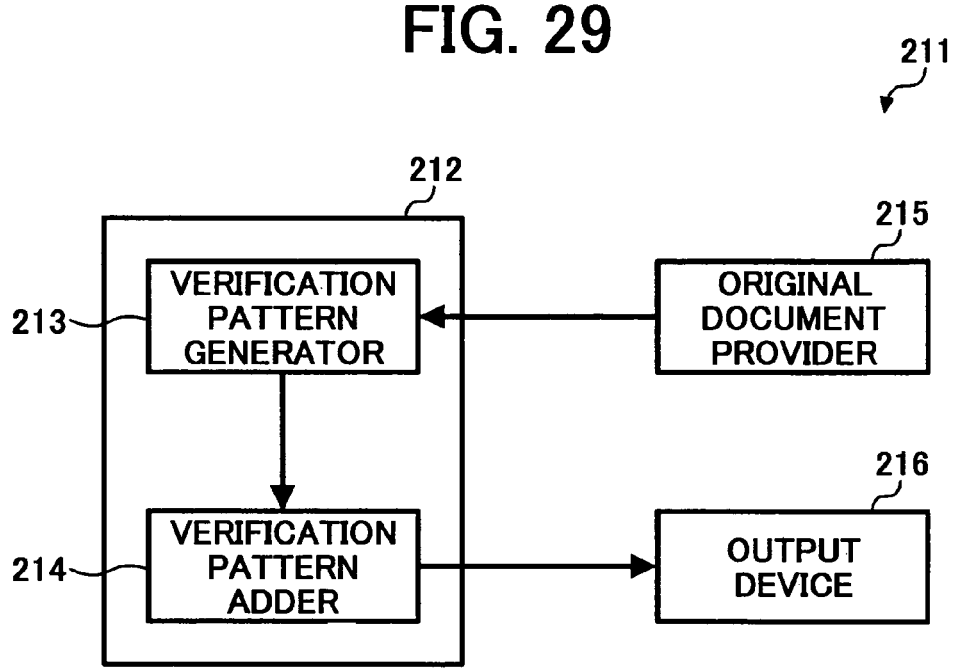
FIG. 29 is a block diagram illustrating a functional structure of an image processing system according to a preferred embodiment of the present invention.

Referring to FIG. 29, the image processing apparatus 212 includes a verification pattern generator 213 and a verification pattern adder 214. The verification pattern generator 213 is coupled to an original document provider 215. The verification pattern adder 214 is coupled to an output device 216.

The original document provider 215 provides an original image to the verification pattern generator 213. The verification pattern generator 213 generates a tampering verification pattern and a copy verification pattern based on the original image, and sends them to the verification pattern adder 214. The verification pattern adder 214 embeds the tampering verification pattern and the copy verification pattern to the original image, respectively, and provides the resultant original image to the output device 216 as a protected image. The output device 216 outputs the protected image.

The original document provider 215 may include any kind of reading device capable of reading an original image, such as a scanner. Alternatively, the original document provider 215 may include any kind of storage device capable of previously storing an original image.

The output device 216 includes any kind of image forming device capable of visualizing the protected image, such as a printer or copier.

With the original document provider 215 and the output device 216, the image processing apparatus 212 may form an image processing system 211, capable of generating a protected image having a tampering verification pattern and a copy verification pattern.

Figure 30:
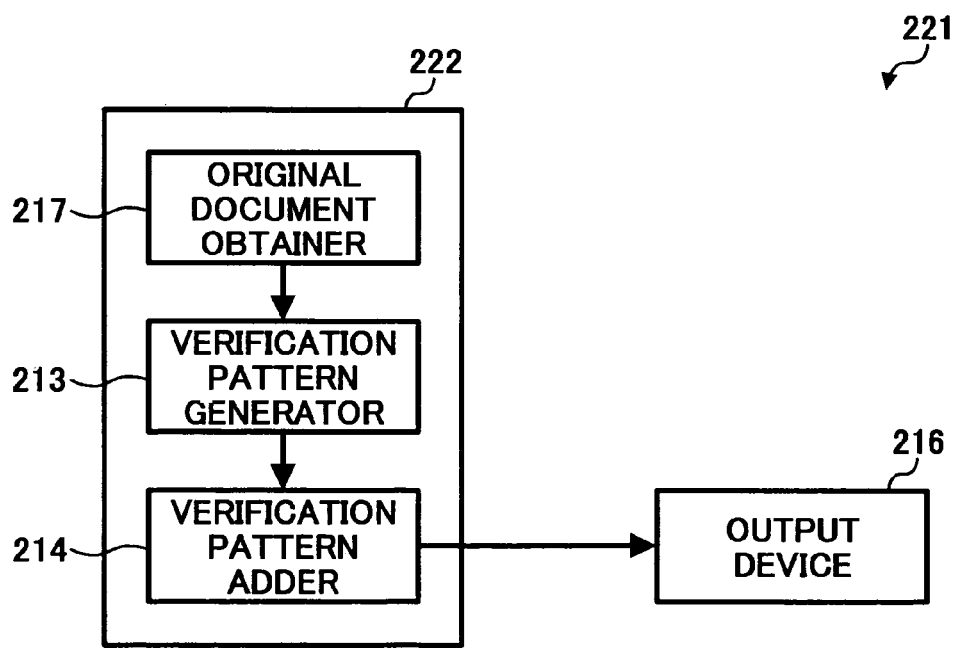
FIG. 30 is a block diagram illustrating a functional structure of an image processing system according to another preferred embodiment of the present invention.

The image processing apparatus 222 shown in FIG. 30 is substantially similar to the image processing apparatus 212 of FIG. 29, except for the addition of an original image obtainer 217. The original document obtainer 217 obtains an original image from the outside. In other words, the image processing apparatus 222 and the output device 6 may form an image processing system 221, which functions similarly to the image processing system 211.

Figure 31:
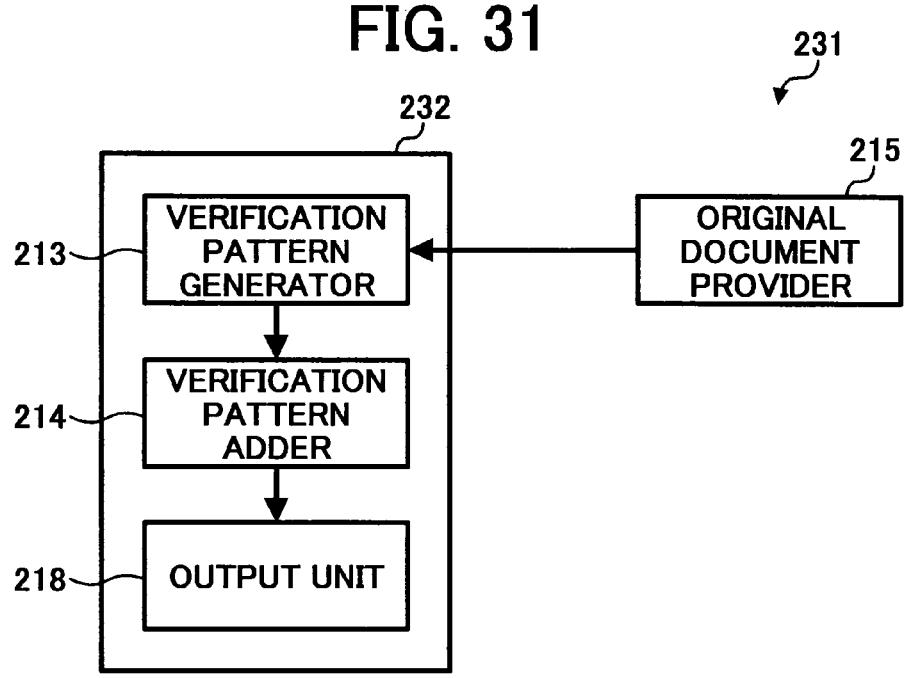
FIG. 31 is a block diagram illustrating a functional structure of an image processing system according to another preferred embodiment of the present invention.

The image processing apparatus 232 shown in FIG. 31 is substantially similar to the image processing apparatus 212 of FIG. 29, except for the addition of an output unit 218. The output unit 218 outputs a protected image. In other words, the image processing apparatus 232 and the original document provider 215 may form an image processing system 231, which functions similarly to the image processing system 211.

Figure 32:
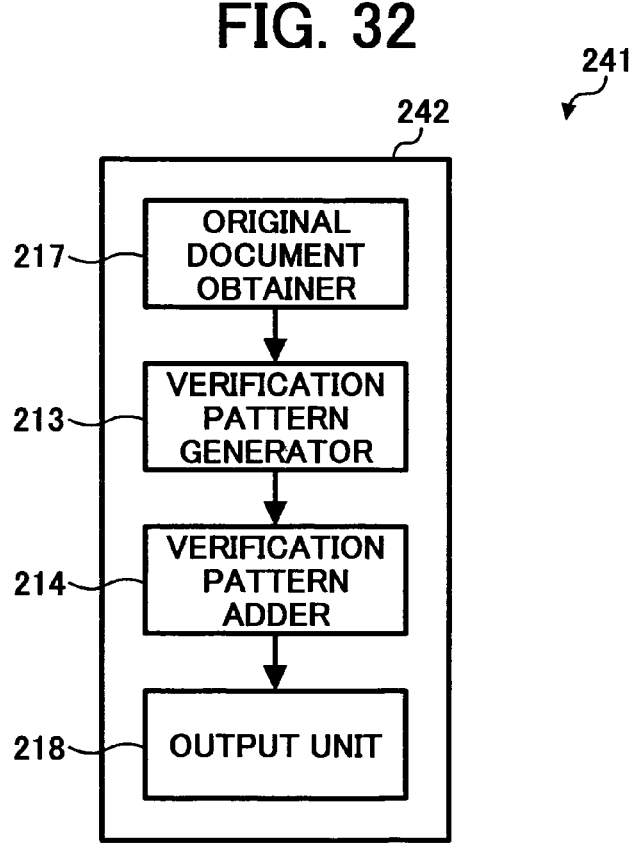
FIG. 32 is a block diagram illustrating a functional structure of an image processing system according to another preferred embodiment of the present invention.

Referring to FIG. 32, the image processing apparatus 242 includes the original document obtainer 217, the verification pattern generator 213, the verification pattern adder 214, and the output unit 218. Thus, the image processing apparatus 242 may form an image processing system 241, which functions similarly to any one of the image processing systems 211, 221, and 231.

The above-described and other image processing systems, capable of generating a protected image having tampering and copying verification patterns, may be implemented as the image processing system 100 of FIG. 5, for example. In this case, however, the HDD 104 stores a verification pattern generating program for generating different kinds of verification patterns, including a tampering verification pattern and a copy verification pattern.

Referring now to FIGS. 33 to 35, a description is made of generating a protected image having a tampering verification pattern and a copy verification pattern.

The image processing system 100 obtains an original image to be processed. The original image is preferably an image of a monetary document such as a paper currency, a security, or a check, for example. Alternatively, an image of any confidential document such as a contract may be used. The following illustrates an exemplary case of using an image obtained from a receipt shown in FIG. 33 as the original image R1.

The image processing system 100 generates a copy verification pattern, having an outline previously defined. In addition, the image processing system 100 generates a tampering verification pattern from the original image R1.

In this exemplary case, the copy verification pattern includes a plurality of small dots, with each small dot having a size small enough to be invisible to the human eye when printed. The tampering verification pattern includes a plurality of large dots, with each large dot having a size large enough to be visible to the human eye when printed.

Alternatively, any one of the copy verification pattern and the tampering verification pattern may be formed with different kinds of dots. For example, dots may be different from one another in terms of size, color, etc.

The image processing system 100 divides the original image R1 into a tampering detection area A1 and a copy detection area A2, as shown in FIG. 34. The tampering detection area A1 includes a background portion of the original image R1. The copy detection area A2 preferably includes a predetermined outline, which corresponds to the outline of the copy verification pattern and is formed by any kind of character, character string, or graphic symbol. For example, as illustrated in FIG. 34, the copy detection area A2 may have an outline formed by a character string "VOID". In another example, as illustrated in FIG. 35, the copy detection area A2 may have an outline formed by a character string containing four Chinese characters.

Next, the image processing system 100 adds the tampering verification pattern to the tampering detection area A1, and adds the copy verification pattern to the copy detection area A2, thus generating a protected image R2 of FIG. 34 or 35.

The image processing system 100 outputs the protected image R2, using a printer, for example. Because the copy detection area A2 contains the copy verification pattern formed by the small dots that are invisible, the copy detection area A2 is not printed as shown in FIG. 34 or 35. In this way, unauthorized duplication of the protected image R2 may be prevented.

Figure 36:
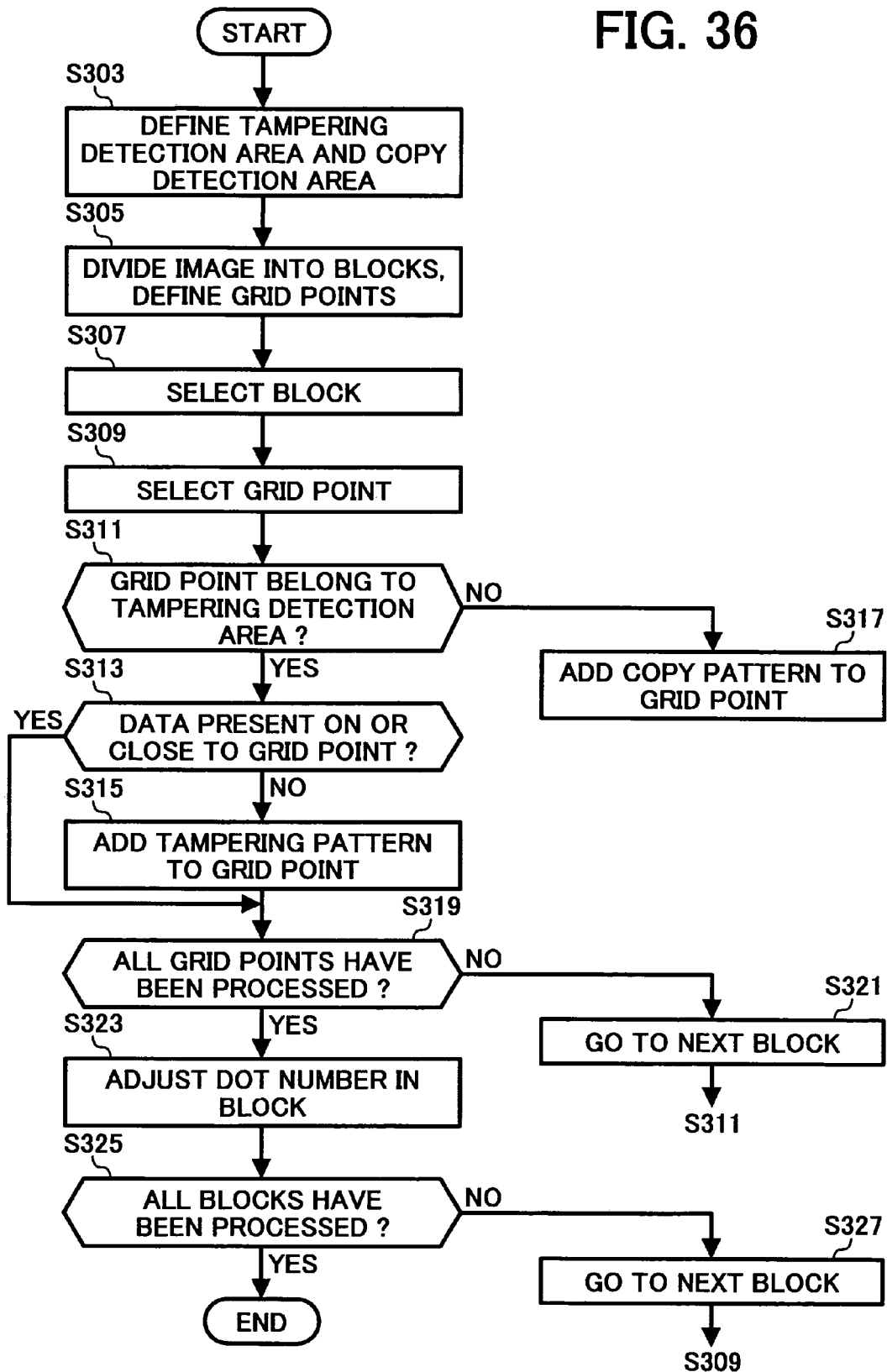
FIG. 36 is a flowchart illustrating an exemplary operation of embedding a verification pattern according to a preferred embodiment of the present invention.

Now, referring to FIG. 36, a description is made of embedding a tampering verification pattern and a copy verification pattern.

Step S303 defines a tampering detection area and a copy detection area.

Figure 37:
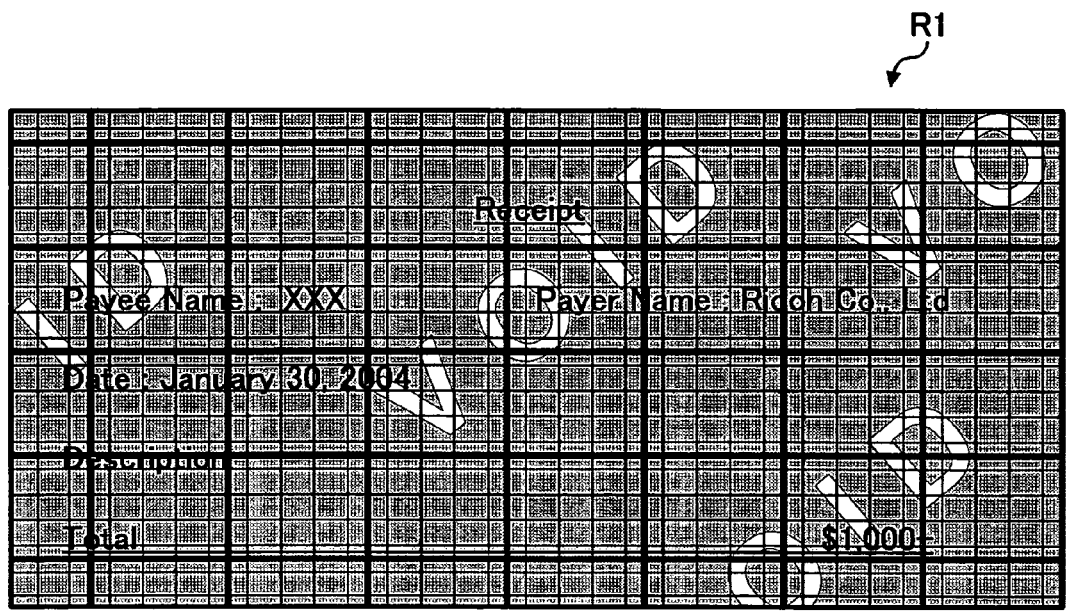
FIG. 37 is an illustration explaining an exemplary operation of dividing the exemplary original document of FIG. 33.

Step S305 divides an original image into a plurality of blocks, and defines grid points as shown in FIG. 37. FIG. 37 defines each block by the darker lines, while it defines each grid point as an intersection of the lighter horizontal and vertical lines.

Step S307 selects a block to be processed.

Step S309 selects a grid point to be processed.

Step S311 determines whether the selected grid point belongs to the tampering detection area. If yes, that is, if the grid point belongs to the tampering detection area, the process moves to Step S313. If no, that is, if the grit point belongs to the area other than the tampering detection area, such as the copy detection area, the process moves to Step S317.

Step S317 adds a copy verification pattern to the copy detection area.

Step S313 determines whether image data is present on or close to the grip point. If yes, that is, if the grid point has image data thereon or close thereto, the process moves to Step S319. If no, that is, if no image data is present on or close to the grid point, the process moves to Step S315.

Figure 38:
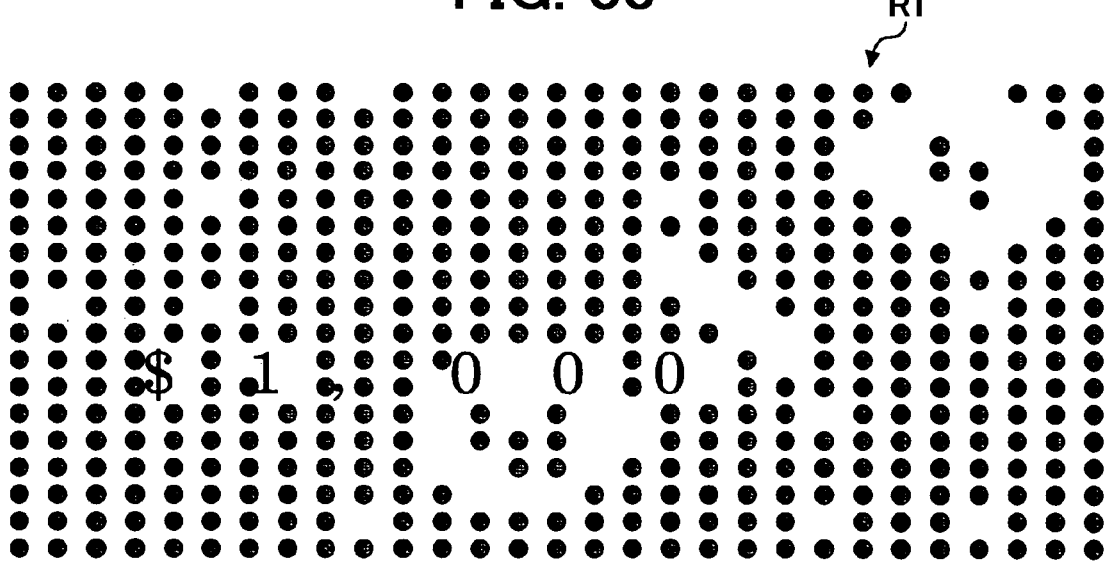
FIG. 38 is an illustration explaining an exemplary operation of embedding a tampering verification pattern according to a preferred embodiment of the present invention.

Step S315 adds a tampering verification pattern to the tampering detection area, as illustrated in FIG. 38.

Step S319 determines whether all grid points in the selected block have been processed. If yes, the process moves to Step S323, otherwise, the process moves to Step S321.

Step S321 selects a next block to be processed, and the process moves to Step S311.

Step S323 adjusts the amount of the tampering verification pattern added in the block. In one example, the number of large dots ("large dot number"), forming the tampering verification pattern, may be adjusted according to a random number previously assigned to the block. In another example, the number of small dots ("small dot number"), forming the copy verification pattern, may be adjusted according to the random number. In yet another example, both of the large dot number and the small dot number may be adjusted, while taking account the size ratio of the large dot and the small dot.

Step S325 determines whether all blocks in the original image have been processed. If yes, the process ends, otherwise, the process moves to Step S327.

Step S327 selects a next block to be processed, and the process moves to Step S309.

Referring now to FIGS. 39A and 39B, adjusting a large dot number is explained. FIG. 39A illustrates a portion of the original image R1 before adjusting the large dot number, while FIG. 39B illustrates a portion of the coriginal image R1 after adjusting the large dot number.

To adjust the large dot number, the image processing system 100 firstly counts the large dot number of each block. As shown in FIG. 39A, the large dot numbers of the first to fifth blocks are 14, 13, 10, 8, and 11, respectively.

Next, the image processing system 100 generates a random number sequence containing 0s and 1s, using a random number generator previously provided, for example. Alternatively, the image processing system 100 may use a random number sequence previously stored.

According to the random number sequence, the image processing system 100 assigns a random number 0 or 1 to each block. In the exemplary case shown in FIG. 39(A), the first, second, third, fourth, and fifth blocks are respectively assigned with 0, 1, 1, 0, and 0.

If the random number 0 is assigned, the image processing system 100 adjusts the large dot number to be an even number, if necessary, by adding or deleting a dot. If the random number 1 is assigned, the image processing system 100 adjusts the large dot number to be an odd number, if necessary, by adding or deleting a dot.

In the exemplary case shown in FIGS. 39A and 39B, the first block having the large dot number 14 and assigned with the random number 0 remains unchanged. The second block having the large dot number 13 and assigned with the random number 1 remains unchanged. The third block having the large dot number 10 and assigned with the random number 1 is changed to have the large dot number 9. The fourth block having the large dot number 8 and assigned with the random number 0 remains unchanged. The fifth block having the large dot number 11 and assigned with the random number 0 is changed to have the large dot number of 10.

For prevention of unauthorized duplication, the image processing system 100 prints the protected image embedded with the copy verification pattern, which is visible, as shown in FIG. 34 or 35.

To allow a user to select to add or not to add the copy verification pattern and/or the tampering verification pattern, the image processing system 100 may be additionally provided with a selector, for example. The selector may be turned on when the user selects to add the copy verification pattern and/or the tampering verification pattern. Alternatively, the image processing system 100 may receive an instruction indicating such selection from the outside system, and operate according to the received instruction.

Figure 40A:
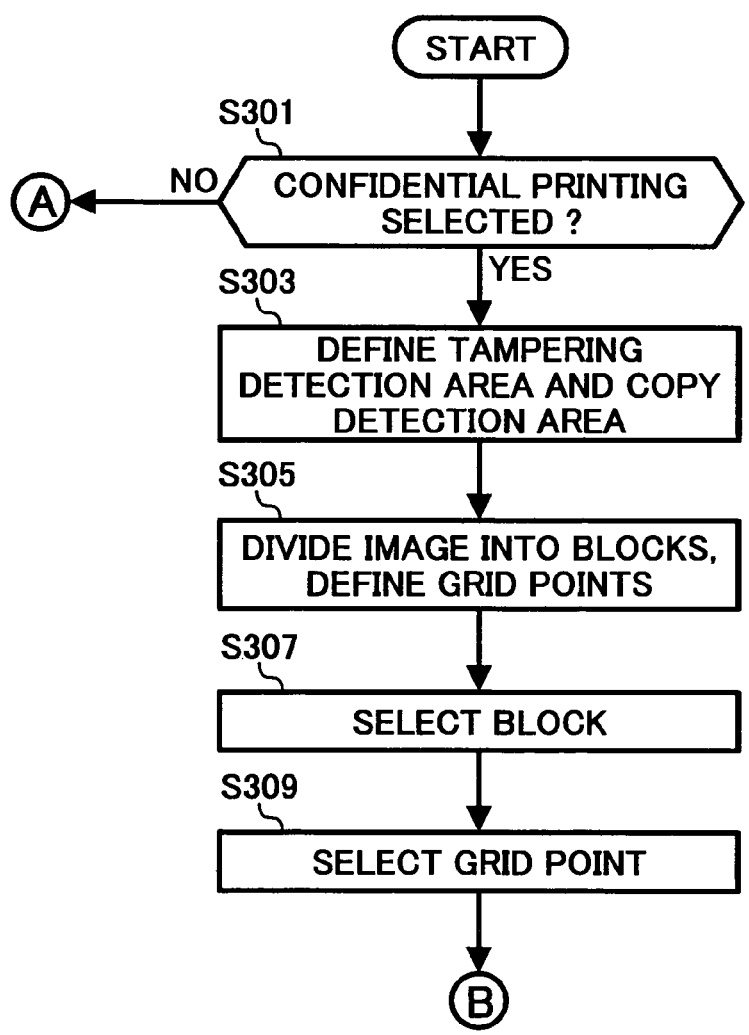
FIGS. 40A and 40B are flowcharts illustrating an exemplary operation of printing a protected image according to a preferred embodiment of the present invention.
Figure 40B:
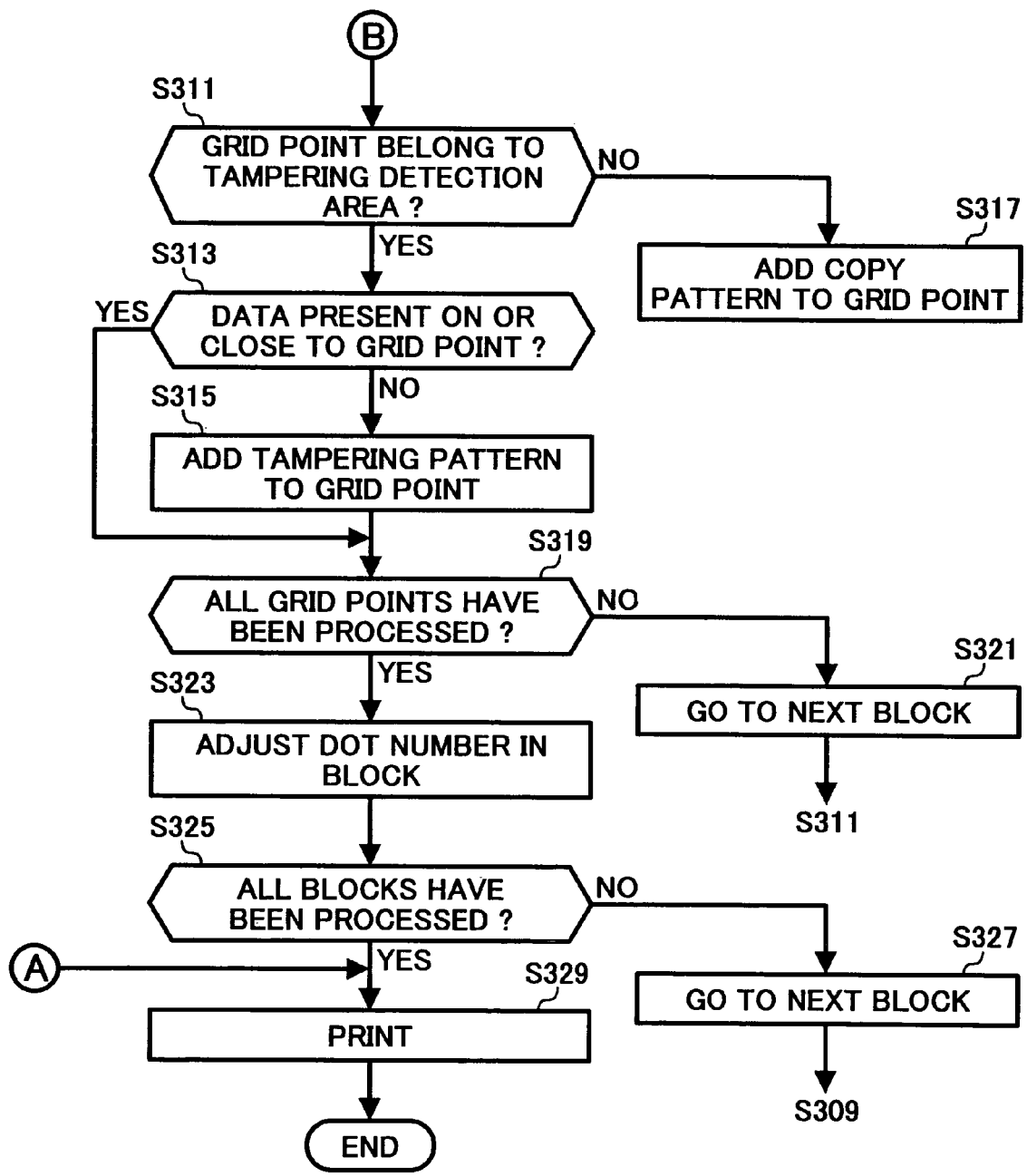

FIGS. 40A and 40B illustrate an exemplary case of selecting to add or not to add the tampering verification pattern and/or copy verification pattern. The flowcharts shown in FIGS. 40A and 40B are substantially similar to the one shown in FIG. 36, except for the addition of Step S301 and Step S329.

Step S301 determines whether confidential document printing is selected. If the confidential document printing is selected, the process moves to Step S303, and eventually to Step S329 to print the protected image having the verification patterns. If the confidential document printing is not selected, the process moves to Step S329 to print the original image.

Now, referring to FIGS. 41 to 44, image processing apparatus 252, 262, 272, and 282, capable of detecting image alteration or unauthorized duplication, according to other preferred embodiments of the present invention are explained.

Figure 41:
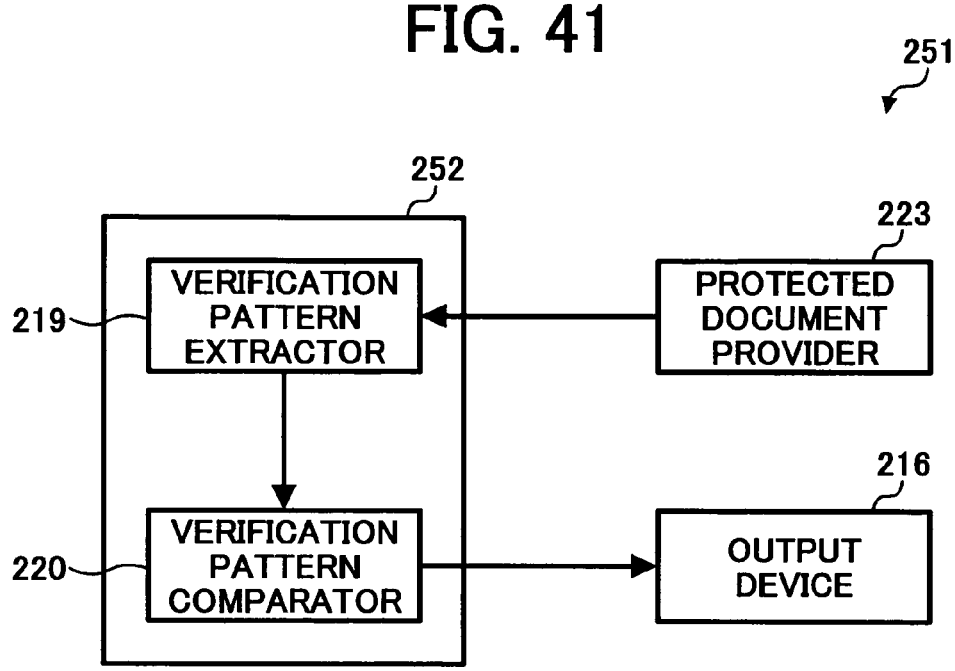
FIG. 41 is a block diagram illustrating a functional structure of an image processing system according to a preferred embodiment of the present invention.

Referring to FIG. 41, the image processing apparatus 252 includes a verification pattern extractor 219 and a verification pattern comparator 220. The verification pattern extractor 219 is coupled to a protected document provider 223. The verification pattern comparator 220 is coupled to the output device 216.

The protected document provider 223 provides a protected image to the verification pattern extractor 219. The verification pattern extractor 219 extracts a verification pattern from the protected image, and sends it to the verification pattern comparator 220. The verification pattern comparator 220 determines whether any one of the tampering verification pattern and the copy verification pattern has a large dot number or a small dot number corresponding to a random number previously provided or obtained from the outside system. The output device 216 outputs a detection result indicating such determination.

The protected document provider 223 includes any kind of reading device capable of reading a protected image or any kind of storage device capable of storing a protected image.

With the protected document provider 223 and the output device 216, the image processing apparatus 252 may form an image processing system 251, capable of detecting image alteration or unauthorized duplication of a protected image.

Figure 42:
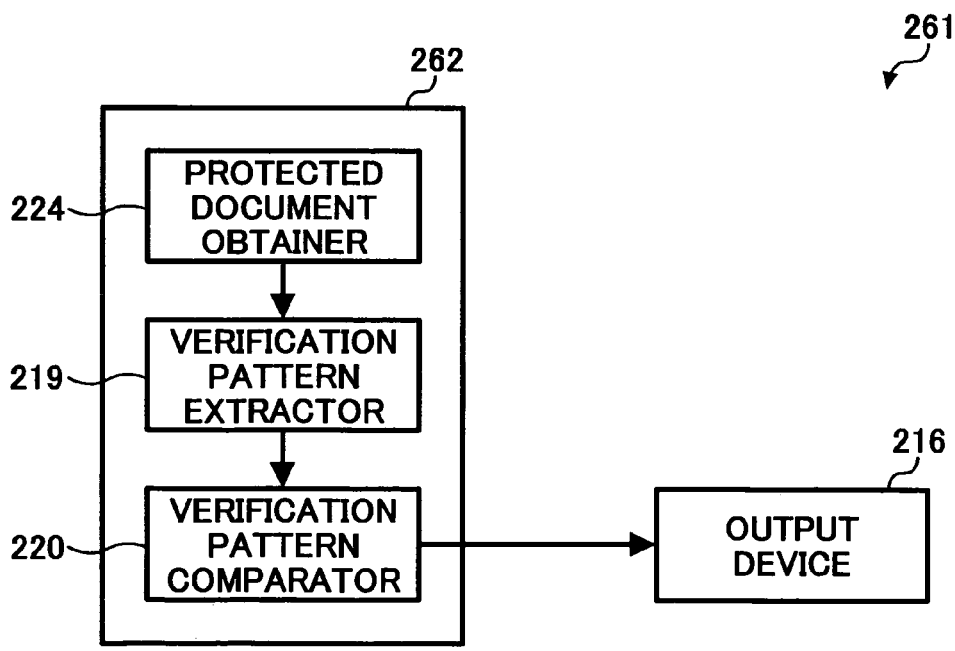
FIG. 42 is a block diagram illustrating a functional structure of an image processing system according to another preferred embodiment of the present invention.

The image processing apparatus 262 of FIG. 42 is substantially similar to the image processing apparatus 252 of FIG. 41, except for the addition of a protected document obtainer 224. The protected document obtainer 224 obtains a protected image from the outside. In other words, the image processing apparatus 262 and the output device 216 may form an image processing system 261, which functions similarly to the image processing system 251.

Figure 43:
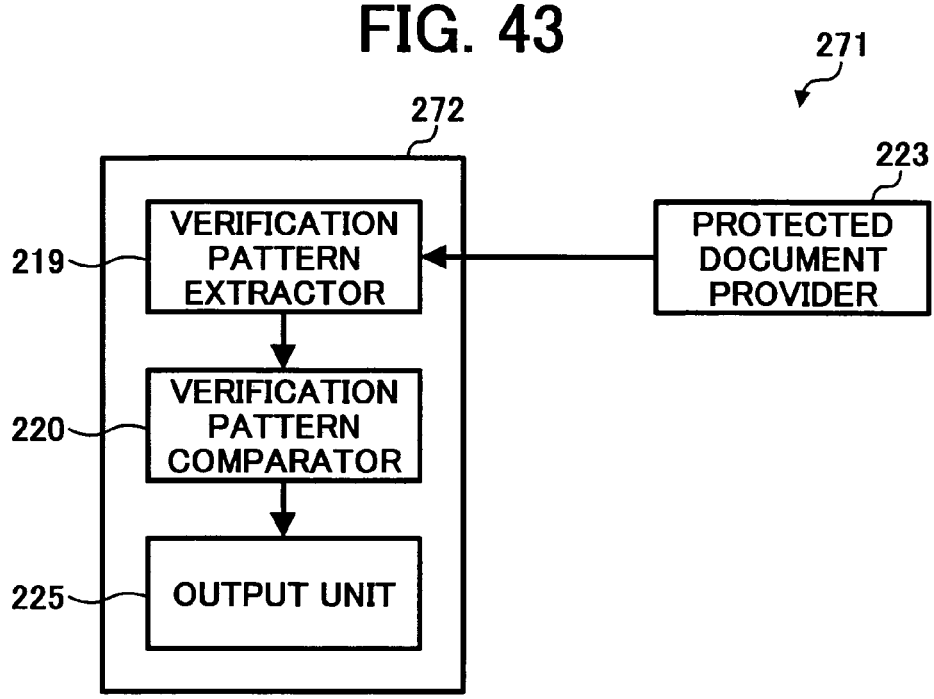
FIG. 43 is a block diagram illustrating a functional structure of an image processing system according to another preferred embodiment of the present invention.

The image processing apparatus 272 of FIG. 43 is substantially similar to the image processing apparatus 252 of FIG. 41, except for the addition of an output unit 225. The output unit 225 outputs a detection result. In other words, the image processing apparatus 272 and the protected document provider 223 may form an image processing system 271, which functions similarly to the image processing system 251.

Figure 44:
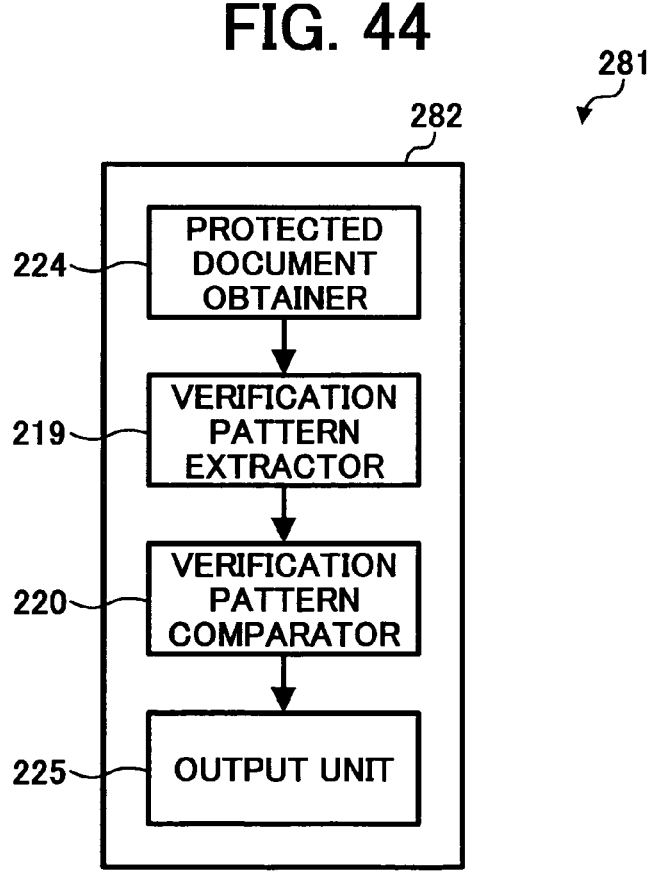
FIG. 44 is a block diagram illustrating a functional structure of an image processing system according to another preferred embodiment of the present invention.

Referring to FIG. 44, the image processing apparatus 282 includes the protected document obtainer 224, the verification pattern extractor 219, the verification pattern comparator 220, and the output unit 225. Thus, the image processing apparatus 282 may form an image processing system 281, which functions similarly to any one of the image processing systems 251, 261, and 271.

The above-described and other image processing systems, capable of detecting image alteration or unauthorized duplication, may be implemented in various ways, for example, as shown in FIG. 15. In this case, however, the HDD 104 stores a verification pattern detecting program for detecting integrity of a tampering verification pattern.

Figure 45:
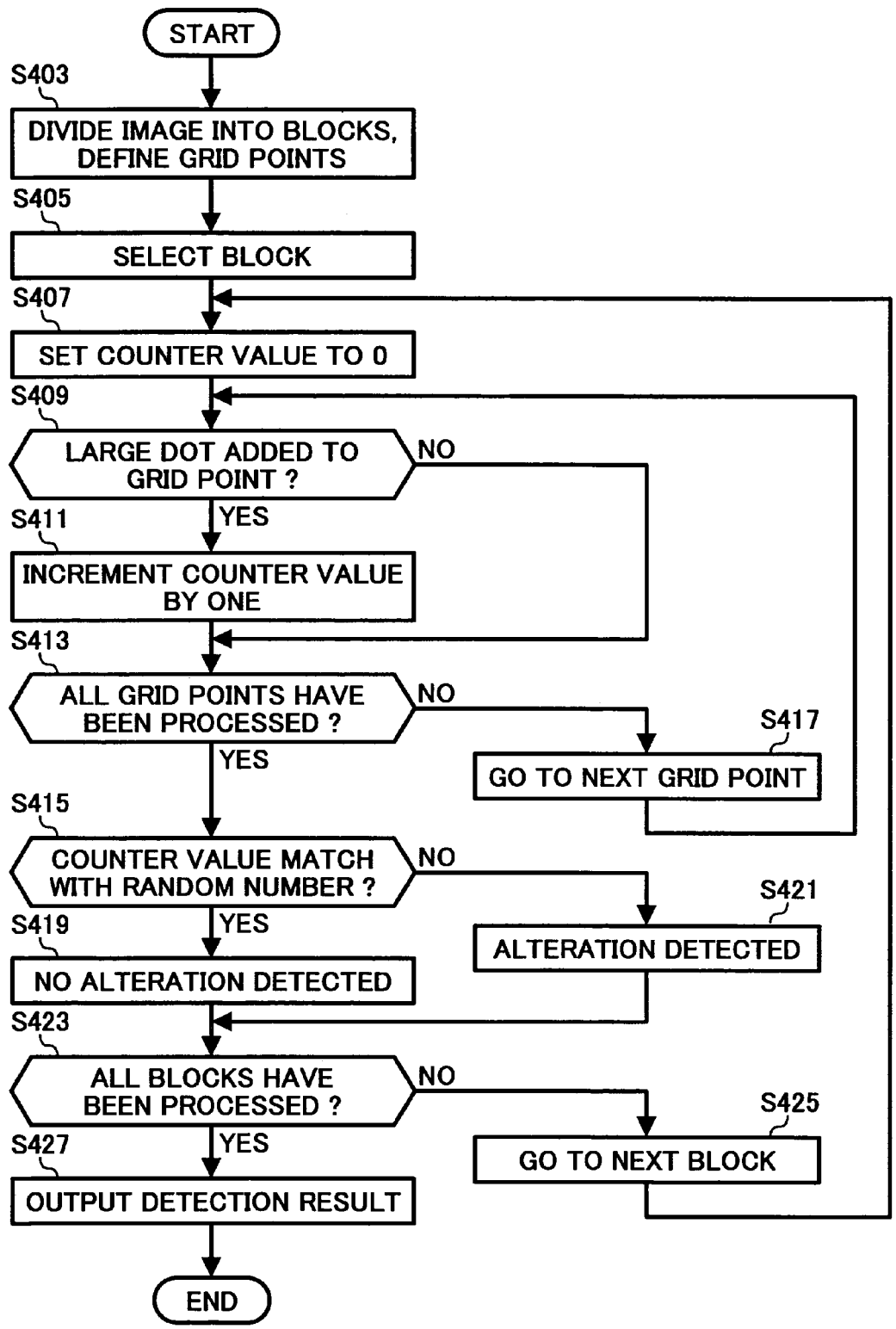
FIG. 45 is a flowchart illustrating an exemplary operation of detecting image alteration according to a preferred embodiment of the present invention.

Referring now to FIG. 45, detecting image alteration using a tampering verification pattern is explained.

Step S403 divides the original image into a plurality of blocks, and defines grid points, in a substantially similar manner as described referring to FIG. 37.

Step S405 selects a block to be processed.

Step S407 initializes a counter, previously provided, for counting a large dot number of the tampering verification pattern. More specifically, the counter value is set to 0.

Step S409 selects a grid point to be processed, and determines whether the grid point has a large dot added thereto. If yes, that is, if the large dot has been added, the process moves to Step S411. If no, that is, no large dot has been added, the process moves to Step S413.

Step S411 increments the counter value by one.

Step S413 determines whether all grid points in the block have been processed. If yes, the process moves to Step S415. Otherwise, the process moves to Step S417, and further to Step S409.

Step S415 determines whether the counter value corresponds to a random number previously provided. If yes, that is, if the counter value matches the random number, the process moves to Step S419 to determine that no image alteration is detected. If no, that is, if the counter value does not match the random number, the process moves to Step S421 to determine that image alteration is detected.

Figure 46:
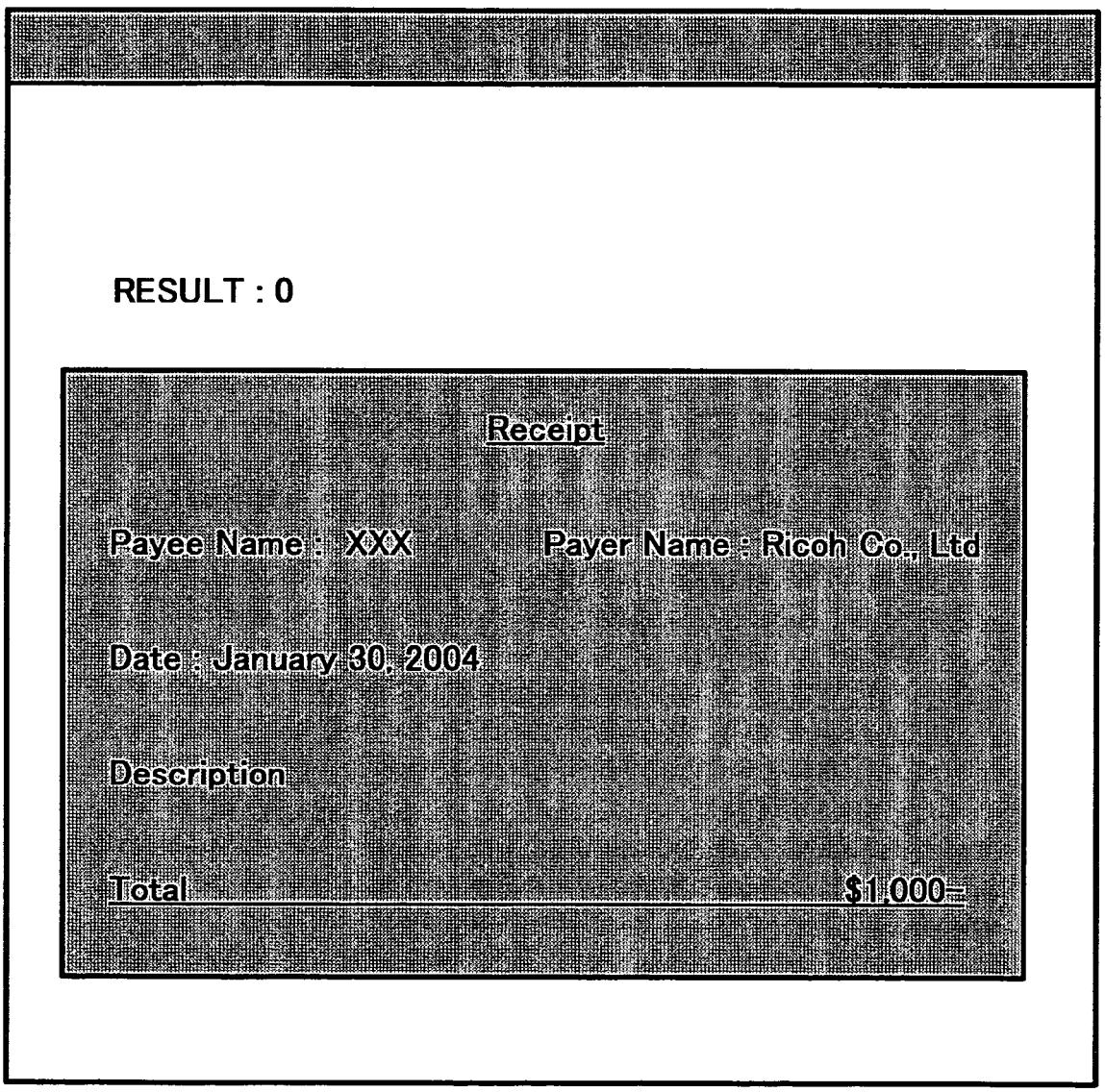
FIG. 46 is an illustration showing an exemplary display of a detection result according to a preferred embodiment of the present invention.
Figure 47:
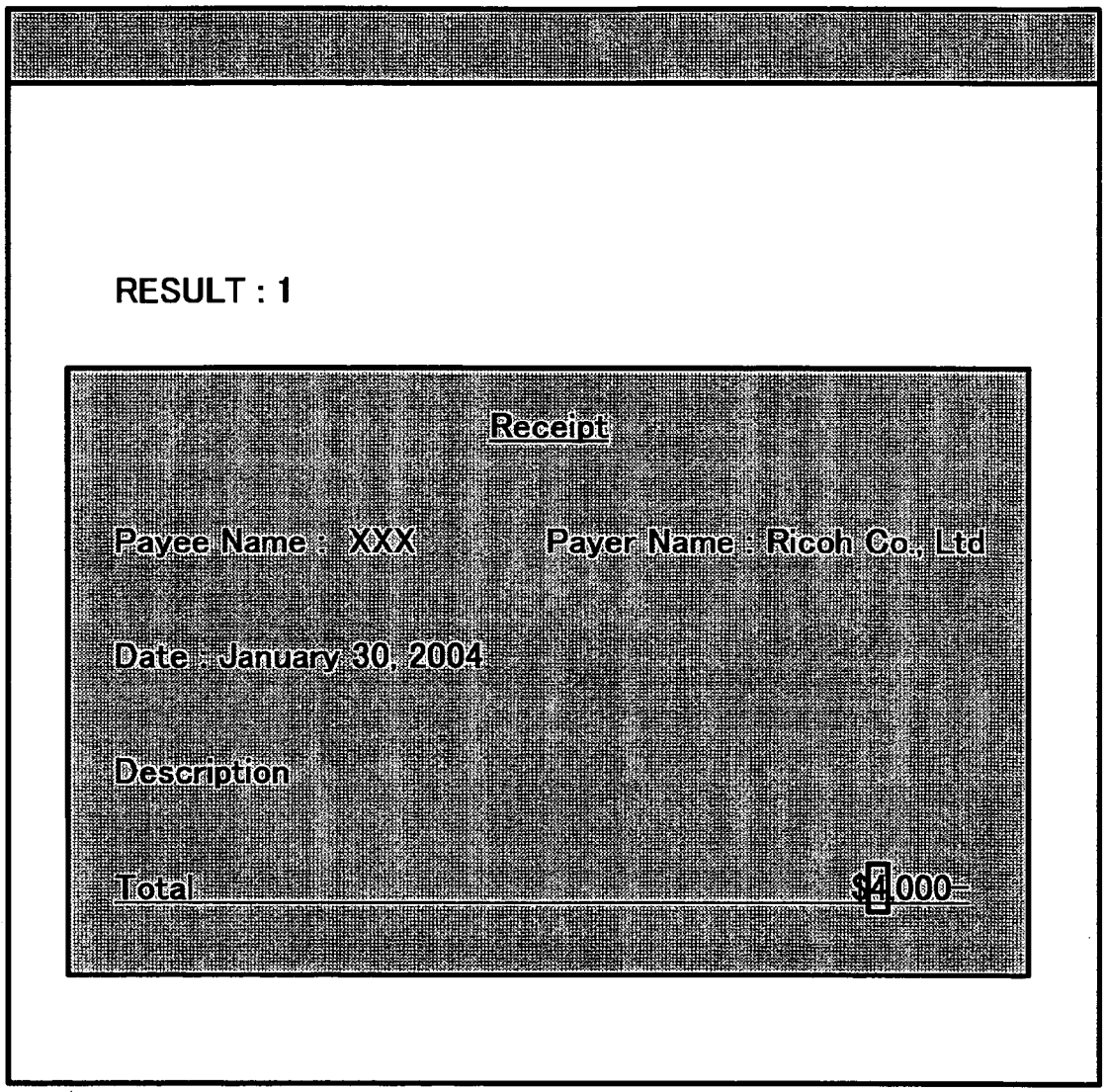
FIG. 47 is an illustration showing an exemplary display of a detection result according to another preferred embodiment of the present invention.

Step S427 outputs a detection result indicating such determination. For example, if the detection result indicates that no image alteration is detected, the display 208 may display the detection result as shown in FIG. 46. If the detection result indicates that image alteration is detected, the display 208 may display the detection result as shown in FIG. 47, for example. The exemplary display shown in FIG. 47 shows that the number "1" has been altered to the number "4".

FIG. 45 illustrates the exemplary case of detecting image alteration using the tampering verification pattern, however, the copy verification pattern may be also used for detection. For example, if the large dot forming the tampering verification pattern has a size nine times larger than the size of the small dot forming the copy verification pattern, the counter value is incremented by ⅑ each time it detects a small dot.

Referring to FIGS. 48A and 48B, detecting image alteration using a tampering verification pattern is explained according to another preferred embodiment of the present invention. Specifically, the example shown in FIG. 48 corresponds to the exemplary case shown in FIG. 47, which indicates that the number "1" has been altered to the number "4".

As shown in FIG. 48A, the first block, second block, third block, fourth block, and fifth block originally have large dot numbers 14, 13, 9, 8, and 10, respectively. Accordingly, the first block, second block, third block, fourth block, and fifth block are originally assigned with the random numbers 0, 1, 1, 0, and 0, respectively.

Figure 49:
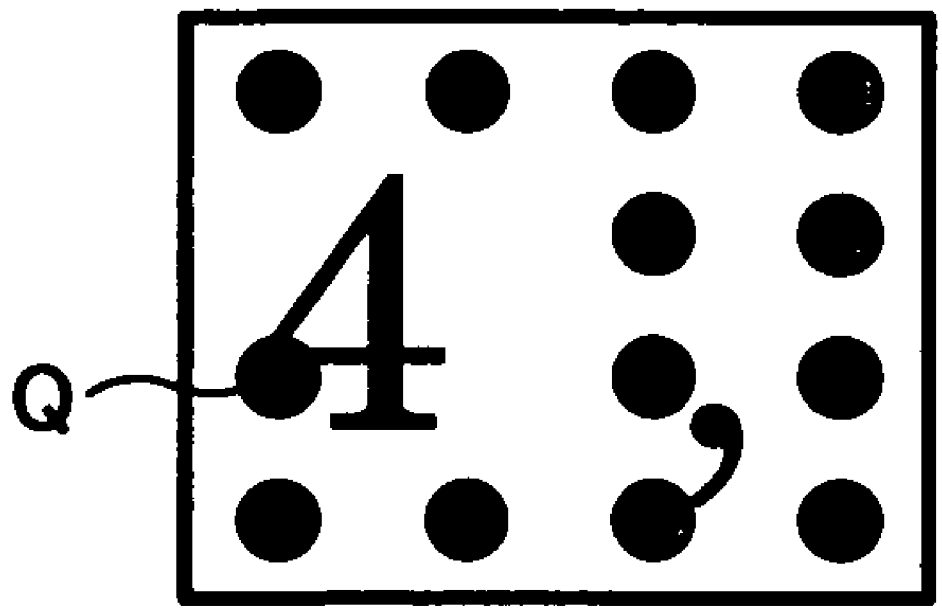
FIG. 49 is an illustration showing a part of the illustration shown in FIG. 48B.

As shown in FIG. 48B, the detected first block, second block, third block, fourth block, and fifth block have large dot numbers 14, 12, 9, 8, and 10, respectively. In this case, as shown in FIG. 49, the large dot Q overlapped with the figure "4" is not counted.

Accordingly, the first block, second block, third block, fourth block, and fifth block are assumed to have been assigned with the random numbers 0, 0, 1, 0, and 0, respectively. Since the detected random number 0 of the second block differs from the previously assigned random number 1 of the second block, it is determined that the image data contained in the second block is altered.

Each of the blocks illustrated in FIGS. 48A and 48B has a size larger than the size of the figure, however, the size of each block may be reduced to be smaller than the figure, as illustrated in FIGS. 50A and 50B.

The four blocks B1 to B4 shown in FIG. 50A correspond to the second block of FIG. 48A containing the figure "1". The four blocks B5 to B8 shown in FIG. 50B corresponds to the second block of FIG. 48B containing the figure "4".

Referring to FIG. 50A, the first block B1, second block B2, third block B3, and fourth block B4 originally have large dot numbers 12, 15, 14, and 13, respectively. Thus, the first block B1, second block B2, third block B3, and fourth block B4 are originally assigned with the random numbers of 0, 1, 0, and 1.

Referring to FIG. 50B, the first block B5, second block B6, third block B7, and fourth block B8 have large dot numbers of 14, 15, 11, and 13, respectively. Thus, the first block B5, second block B6, third block B7, and fourth block B8 are assumed to have been originally assigned with the random numbers of 0, 1, 1, and 1.

By comparing the originally assigned random numbers of FIG. 50A and the detected random numbers of FIG. 50B, it may be determined that the third block B3 has image data being altered.

Now, referring to FIG. 51, an image processing apparatus 292 is explained according to another preferred embodiment of the present invention.

The image processing apparatus 292 of FIG. 51 is substantially similar to the image processing apparatus 242 of FIG. 32, except for the addition of a verification area designator 226.

The verification area designator 226 selects a verification area of the original image, to which a tampering verification pattern is added. The verification pattern adder 214 adds the tampering verification pattern to the verification area, thus generating a protected image R3 shown in FIG. 52, for example.

Figure 53A:
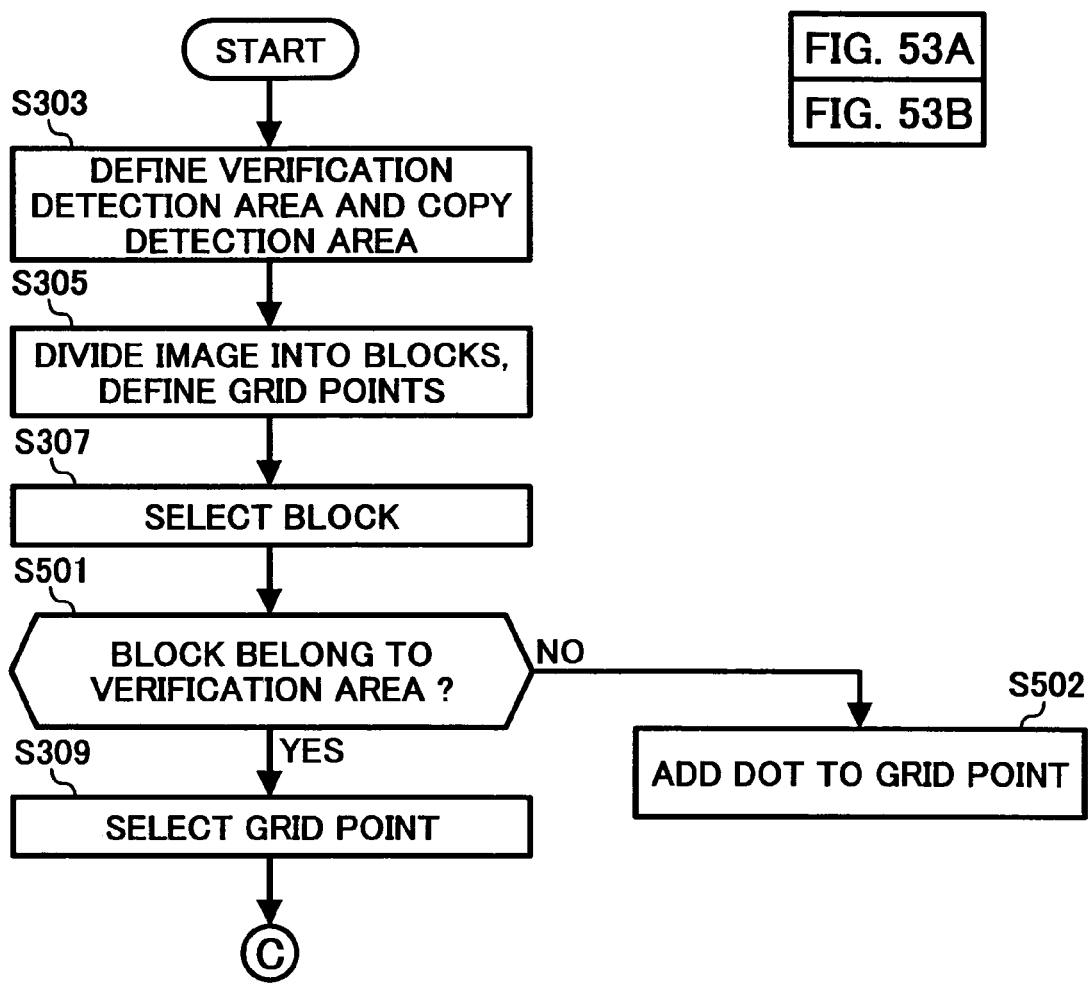
FIGS. 53A and 53B are flowcharts illustrating an exemplary operation of detecting image alteration, according to a preferred embodiment of the present invention.
Figure 53B:
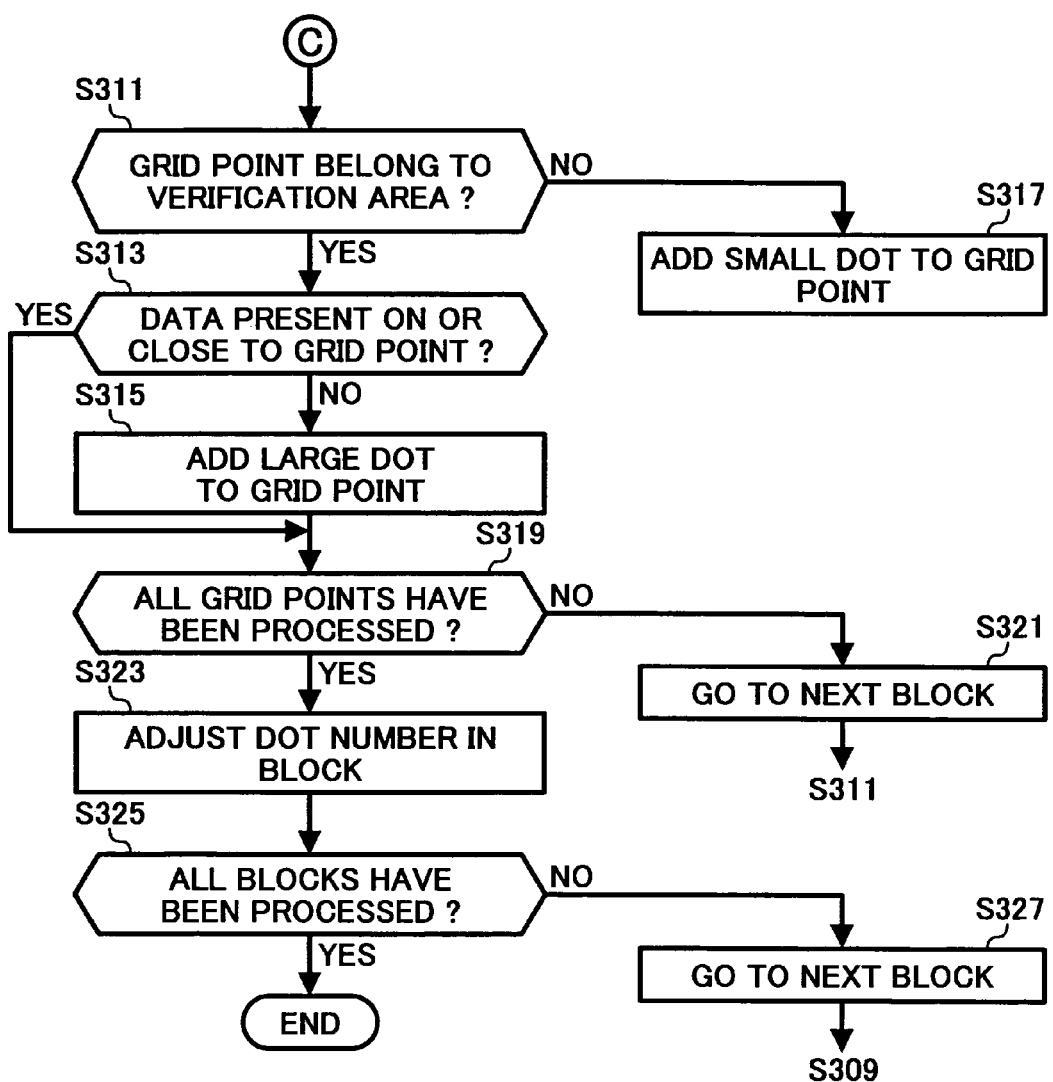

Now, referring to FIGS. 53A and 53B, embedding a tampering verification pattern and a copy verification pattern is explained. The flowcharts of FIGS. 53A and 53B are substantially similar to the one shown in FIG. 36, except for the addition of Steps S501 and S502.

Step S501 determines whether the selected block belongs to the verification area. If yes, the process moves to Step S309. If no, the process moves to Step S502 to add a dot of another type to the selected block.

The dot may have any kind of dot size, as long as the size is large enough to be visible to the human eye when printed. Alternatively, the large dot may be added instead of the dot of another type.

Figure 54:
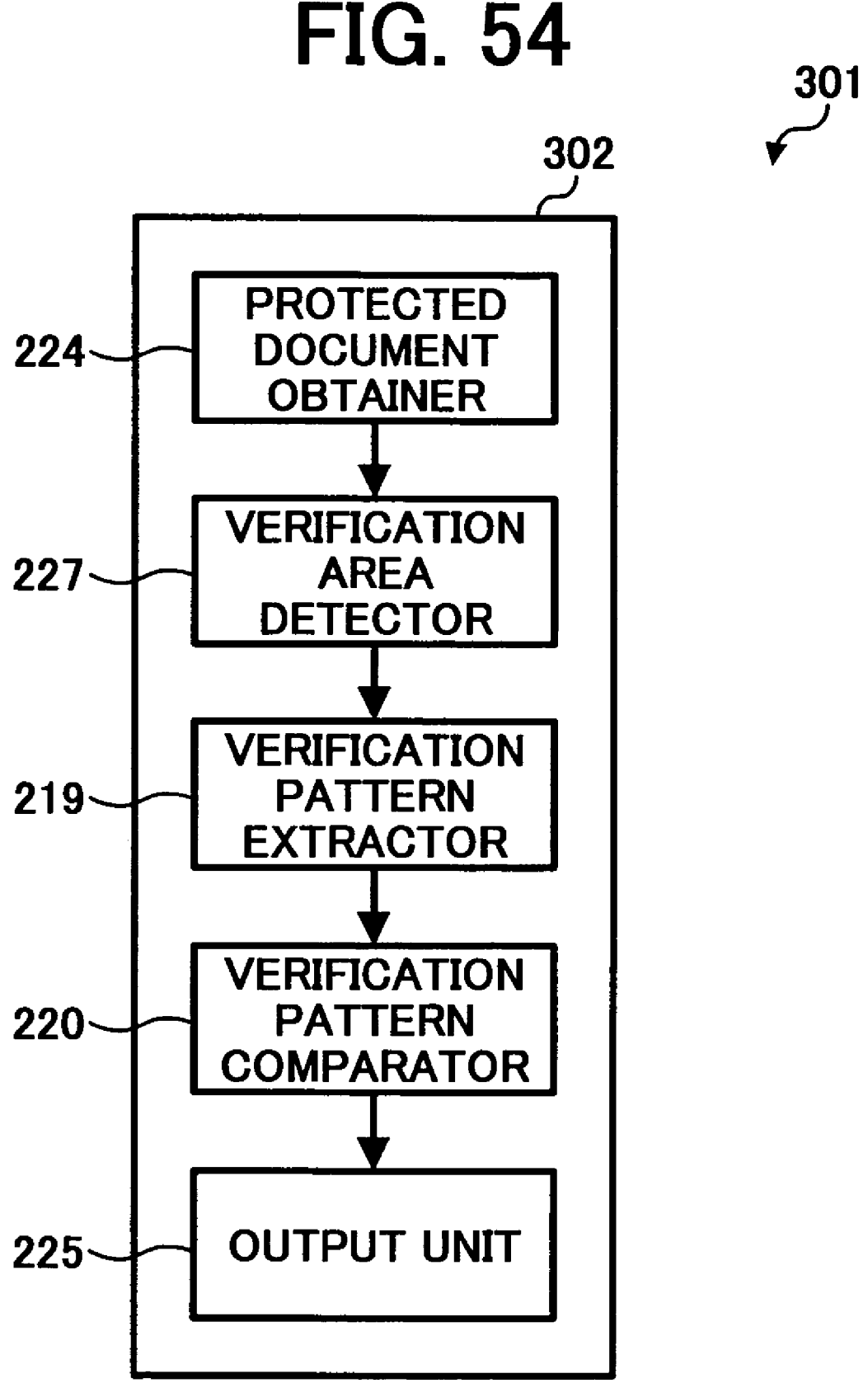
FIG. 54 is a block diagram illustrating a functional structure of an image processing system according to a preferred embodiment of the present invention.

Now, referring to FIG. 54, an image processing apparatus according to another preferred embodiment of the present invention is explained.

The image processing apparatus 302 includes the protected document obtainer 224, the verification area detector 227, the verification pattern extractor 219, the verification pattern comparator 220, and the output unit 225.

The protected document obtainer 224 obtains a protected image having a tampering verification pattern. The verification area detector 227 defines a verification area, to which the tampering verification pattern is added. The verification pattern extractor extracts the verification pattern from the verification area, and sends it to the verification comparator 220. The verification comparator 220 detects whether the protected image is altered based on the verification pattern, and generates a detection result. The output unit 225 outputs the detection result.

Any one of the above-described and other image processing apparatus or systems, capable of generating a tampering verification pattern and a copy verification pattern, may be combined with any one of the image processing apparatus or systems, capable of detecting image alteration or unauthorized duplication, using the tampering verification pattern and the copy verification pattern. Such combined systems may be implemented to have a configuration substantially similar to the one shown in FIG. 5 or 15, for example.

Numerous additional modifications and variations are possible in light of the above teachings. It is therefore to be understood that within the scope of the appended claims, the disclosure of this patent specification may be practiced otherwise than as specifically described herein.

For example, any one of the above-described and other image processing apparatus or systems, capable of detecting document alteration, may be combined with any one of the image processing apparatus or systems, capable of detecting image alteration or unauthorized duplication.

Further, various messages displayed as a part of the comparison result or the detection result may contain different phrases or may be displayed in different ways.

What is claimed as new and desired to be protected by Letters Patent of the United States is:

1. An image processing apparatus, comprising:
    a verification data extractor configured to receive a set of protected images in a sequential order, and to extract a set of detected verification data from the set of protected images;
    a verification data generator configured to generate a set of generated verification data, with each generated verification data generated based on the contents of a corresponding protected image and the contents of a protected image preceding or succeeding the corresponding protected image;
    a verification data comparator configured to compare the set of generated verification data with the set of detected verification data to generate a comparison result, and to determine whether the set of protected images differs from a set of original images based on the comparison result,
    wherein the verification data comparator is further configured to continue determining whether subsequent images in the set of protected images differ from corresponding images in the set of original images after determining that an image in the set of protected images differs from a corresponding image in the set of original images.

2. The image processing apparatus of claim 1, wherein the set of detected verification data includes at least one verification data generated based on the contents of a corresponding original image and the contents of an original image preceding or succeeding the corresponding original image, of the set of original images.

3. The image processing apparatus of claim 1, further comprising:
    a protected document obtainer configured to read a protected document, to convert the protected document to the set of protected images, and to input the set of protected images in the sequential order.

4. The image processing apparatus of claim 3, further comprising:
    a comparison result output configured to output the comparison result in a visual form.

5. The image processing apparatus of claim 1, further comprising:
    a comparison result output configured to output the comparison result in a visual form.

6. The image processing apparatus of claim 1, wherein the verification data generator encodes the generated verification data using cryptography.

7. The image processing apparatus of claim 1, wherein the verification data generator decodes the detected verification data using decryption.

8. The image processing apparatus of claim 1, further comprising
    a page number extractor configured to extract page number data from the set of protected images, and
    wherein the verification data generator is further configured to generate each generated verification data based on the contents of the corresponding protected image, the contents of protected image preceding or succeeding the corresponding protected image, and the page number data of the corresponding protected image.

9. The image processing apparatus of claim 1, further comprising:
    a printer configured to print the set of protected images as a printed protected document.

10. An image processing apparatus, comprising:
    a verification data extractor configured to receive a set of protected images in a sequential order, and to extract a set of detected verification data from the set of protected images;
    a verification data generator configured to generate a set of generated verification data, with each generated verification data generated based on the contents of a corresponding protected image and the contents of a protected image preceding or succeeding the corresponding protected image;
    a verification data comparator configured to compare the set of generated verification data with the set of detected verification data to generate a comparison result, and to determine whether the set of protected images differs from a set of original images based on the comparison result,
    wherein the verification data comparator is further configured to determine whether every image in the set of protected images differs from a corresponding image in the set of original images.

11. The image processing apparatus of claim 10, wherein the comparison result indicates whether each image in the set of protected images differs from a corresponding image in the set of original images.

12. The image processing apparatus of claim 11, wherein the comparison result output comprises a list of every image in the set, of protected images that differs from a corresponding image in the set of original images.

* * * * *